US011190292B2

United States Patent
Kato et al.

(10) Patent No.: US 11,190,292 B2
(45) Date of Patent: Nov. 30, 2021

(54) WAVELENGTH CONVERTER AND OPTICAL TRANSMISSION DEVICE THAT INCLUDES WAVELENGTH CONVERTER

(71) Applicant: FUJITSU LIMITED, Kawasaki (JP)

(72) Inventors: Tomoyuki Kato, Yokohama (JP);
Shigeki Watanabe, Kawasaki (JP);
Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/147,961

(22) Filed: Oct. 1, 2018

(65) Prior Publication Data

US 2019/0109666 A1 Apr. 11, 2019

(30) Foreign Application Priority Data

Oct. 6, 2017 (JP) .............................. JP2017-196427

(51) Int. Cl.
*H04J 14/02* (2006.01)
*H01S 3/094* (2006.01)
(Continued)

(52) U.S. Cl.
CPC .......... *H04J 14/0223* (2013.01); *H01S 3/094* (2013.01); *H04B 10/506* (2013.01);
(Continued)

(58) Field of Classification Search
CPC . H04J 14/0223; H04B 10/506; H04B 10/675; G02F 2/004; G02F 2/008
(Continued)

(56) References Cited

U.S. PATENT DOCUMENTS

| 5,920,588 A | 7/1999 | Watanabe |
| 6,509,987 B1 * | 1/2003 | Hunziker ............. H04B 10/291 |
| | | 398/157 |

(Continued)

FOREIGN PATENT DOCUMENTS

| JP | 1990-068528 | 3/1990 |
| JP | 1992-136823 | 5/1992 |

(Continued)

OTHER PUBLICATIONS

Zhi-shu Shen, et al., "Effectiveness of Wavelength/Waveband Conversion and Its Allowable Cost Bound for Hierarchical Optical Path Networks," IEEE-OSA Journal of Optical Communications and Networking (JOCN), vol. 5, No. 11, pp. 1262-1274, Nov. 2013 (13 pages).

(Continued)

*Primary Examiner* — David G Payne
*Assistant Examiner* — Pranesh K Barua
(74) *Attorney, Agent, or Firm* — Fujitsu Patent Center

(57) ABSTRACT

An optical transmission device includes a first wavelength multiplexer, a second wavelength multiplexer, a wavelength converter and a third wavelength multiplexer. The first wavelength multiplexer multiplexes optical signals in a first wavelength band to generate first wavelength multiplexed light. The second wavelength multiplexer multiplexes optical signals in the first wavelength band to generate second wavelength multiplexed light in a first polarization. The wavelength converter converts a wavelength of the second wavelength multiplexed light from the first wavelength band into a second wavelength band by a cross phase modulation among the second wavelength multiplexed light, first pump light in a second polarization and second pump light in the second polarization. The second polarization is orthogonal to the first polarization. The third wavelength multiplexer (Continued)

multiplexes the second wavelength multiplexed light whose wavelength has been converted by the wavelength converter and the first wavelength multiplexed light.

5 Claims, 13 Drawing Sheets

(51) Int. Cl.
    *H04J 14/06*     (2006.01)
    *H04B 10/50*     (2013.01)
    *H04B 10/67*     (2013.01)
    *G02B 27/10*     (2006.01)
    *G02F 2/00*     (2006.01)

(52) U.S. Cl.
    CPC ........ *H04B 10/675* (2013.01); *H04J 14/0256* (2013.01); *H04J 14/06* (2013.01); *G02B 27/1006* (2013.01); *G02F 2/004* (2013.01)

(58) Field of Classification Search
    USPC .................................. 398/48, 152; 359/326
    See application file for complete search history.

(56) References Cited

U.S. PATENT DOCUMENTS

| | | | |
|---|---|---|---|
| 6,744,553 B1 * | 6/2004 | Islam | G02F 1/3536 359/326 |
| 6,879,433 B1 * | 4/2005 | Yamashita | G02F 1/3536 359/326 |
| 8,731,402 B2 * | 5/2014 | Jander | H04Q 11/0005 398/48 |
| 2001/0007509 A1 * | 7/2001 | Aso | G02F 2/004 359/326 |
| 2002/0163689 A1 * | 11/2002 | Matsushita | H04B 10/29 385/24 |
| 2002/0171913 A1 * | 11/2002 | Batchko | G02F 1/395 359/333 |
| 2002/0176152 A1 * | 11/2002 | Parolari | G02F 1/3519 359/326 |
| 2003/0048503 A1 * | 3/2003 | Aso | H04B 10/506 398/79 |
| 2004/0004780 A1 * | 1/2004 | Watanabe | G02F 1/3515 359/891 |
| 2004/0141229 A1 * | 7/2004 | Kakui | H01S 3/06716 359/342 |
| 2004/0161214 A1 * | 8/2004 | Kajiya | H04B 10/2503 385/123 |
| 2005/0146780 A1 * | 7/2005 | McKinstrie | G02F 1/395 359/330 |
| 2005/0264871 A1 * | 12/2005 | Takahashi | G02F 1/353 359/326 |
| 2006/0092500 A1 * | 5/2006 | Melloni | G02F 1/3536 359/330 |
| 2007/0139762 A1 * | 6/2007 | Mckinstrie | G02F 1/3536 359/332 |
| 2007/0230518 A1 * | 10/2007 | Watanabe | H04B 10/299 372/22 |
| 2008/0130097 A1 * | 6/2008 | McKinstrie | H04B 10/2537 359/330 |
| 2008/0232808 A1 * | 9/2008 | Watanabe | H04B 10/299 398/92 |
| 2009/0190207 A1 * | 7/2009 | Watanabe | G02F 1/395 359/341.3 |
| 2009/0207489 A1 * | 8/2009 | Futami | H04B 10/299 359/489.1 |
| 2009/0274459 A1 * | 11/2009 | Takita | H04Q 11/0005 398/48 |
| 2009/0290882 A1 * | 11/2009 | Watanabe | G02F 1/3536 398/152 |
| 2010/0021105 A1 * | 1/2010 | Watanabe | G02F 1/395 385/11 |
| 2010/0157417 A1 * | 6/2010 | Watanabe | G02F 1/39 359/339 |
| 2010/0183303 A1 * | 7/2010 | Okabe | G02F 1/3519 398/52 |
| 2011/0293273 A1 * | 12/2011 | Futami | G02F 1/3513 398/48 |
| 2015/0036210 A1 * | 2/2015 | Asobe | H01S 3/1083 359/341.3 |

FOREIGN PATENT DOCUMENTS

| | | |
|---|---|---|
| JP | 10-232415 A | 9/1998 |
| JP | 2001-125157 A | 5/2001 |
| JP | 2003-60621 A | 2/2003 |
| JP | 2003-188830 A | 7/2003 |
| JP | 2004-48028 A | 2/2004 |
| JP | 2008-076752 | 4/2008 |

OTHER PUBLICATIONS

Japanese Office Action dated Aug. 3, 2021 tor corresponding Japanese Patent Application No. 2017-196427, with English Translation, 26 pages.

\* cited by examiner

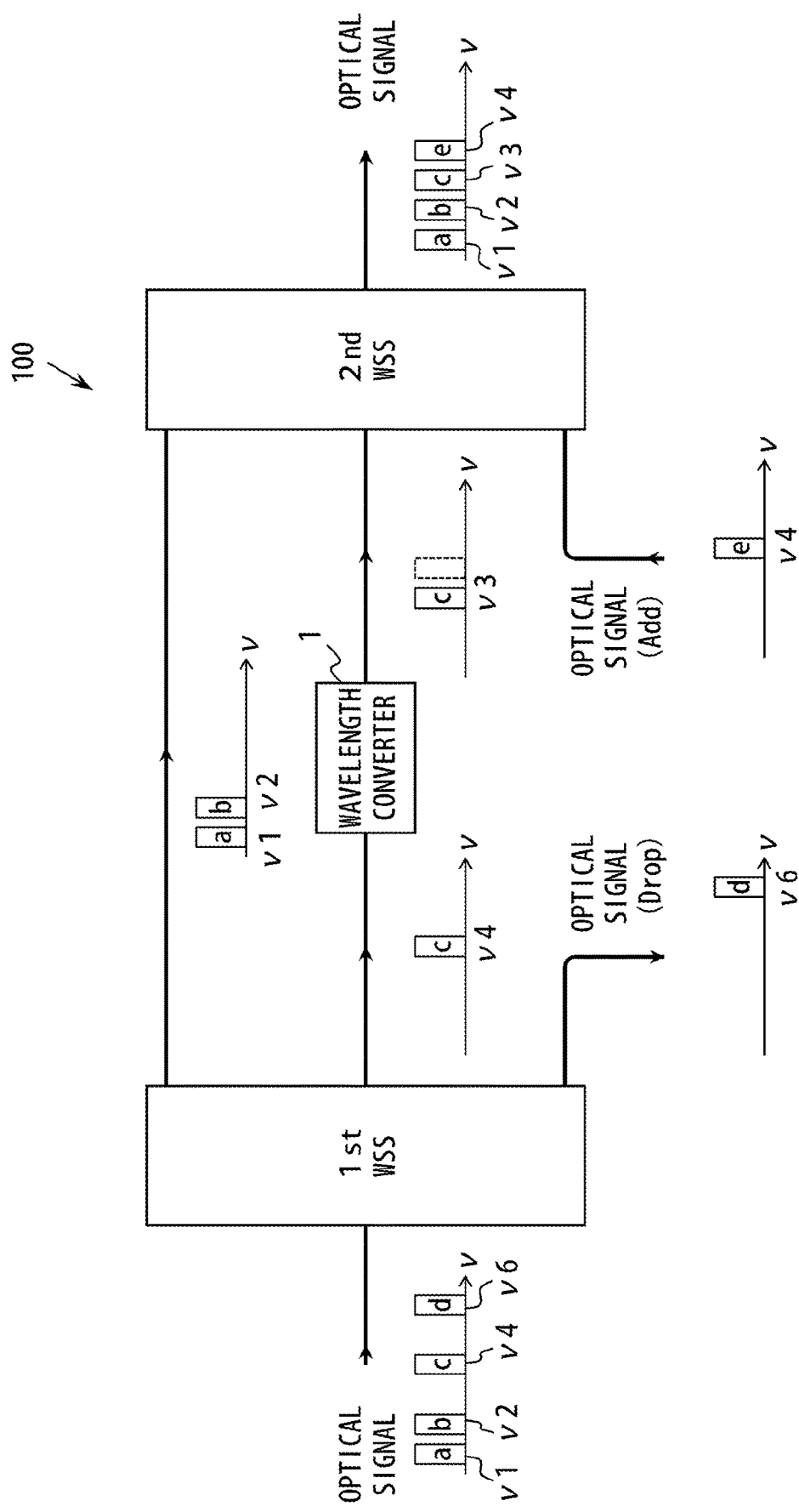
F I G. 1

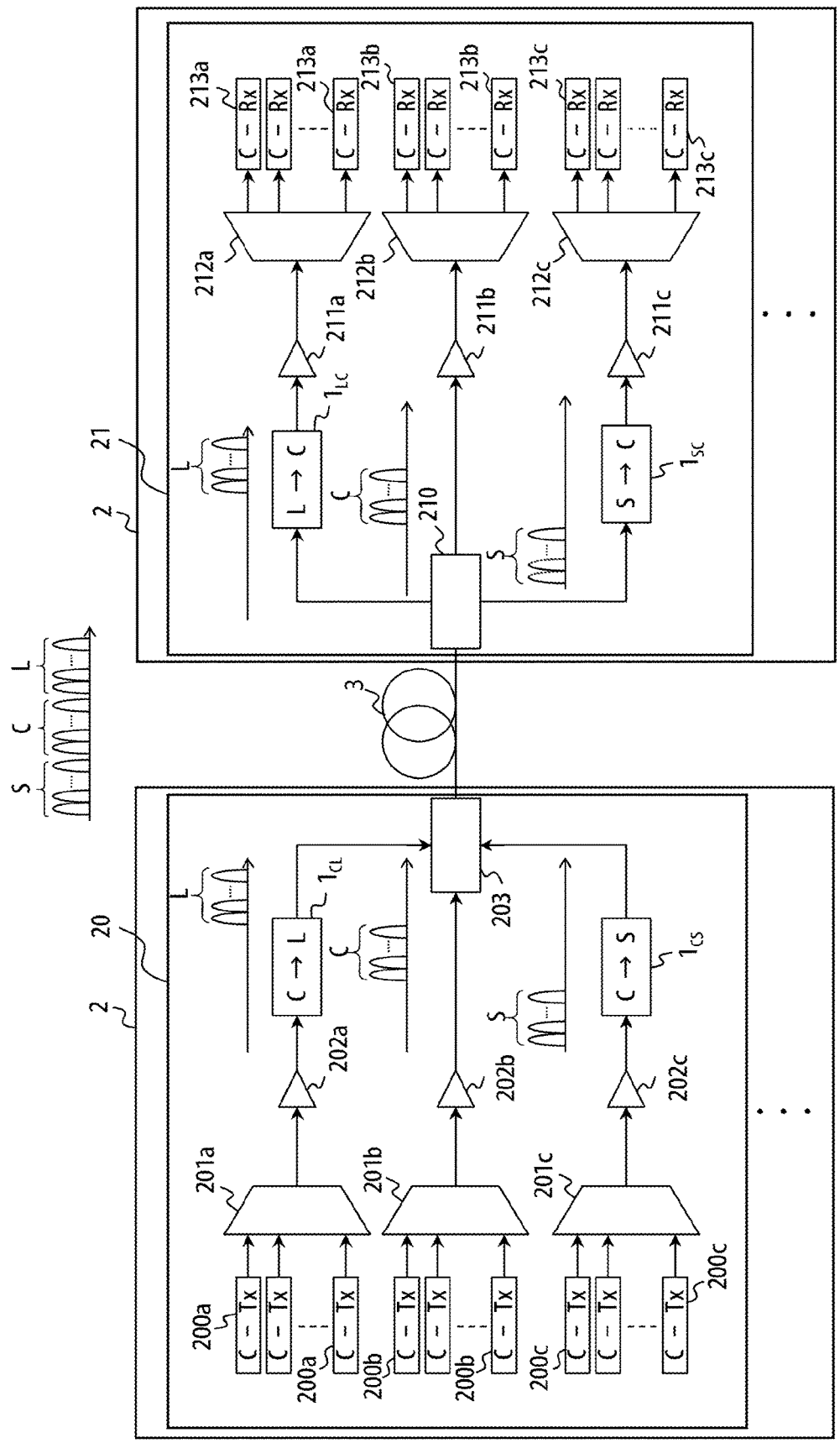
F I G. 2

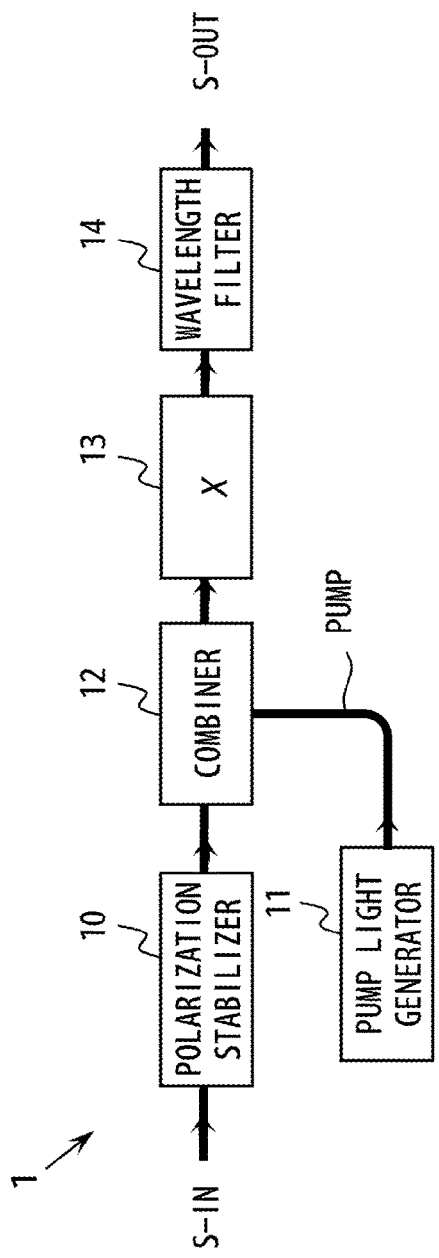
FIG. 3A
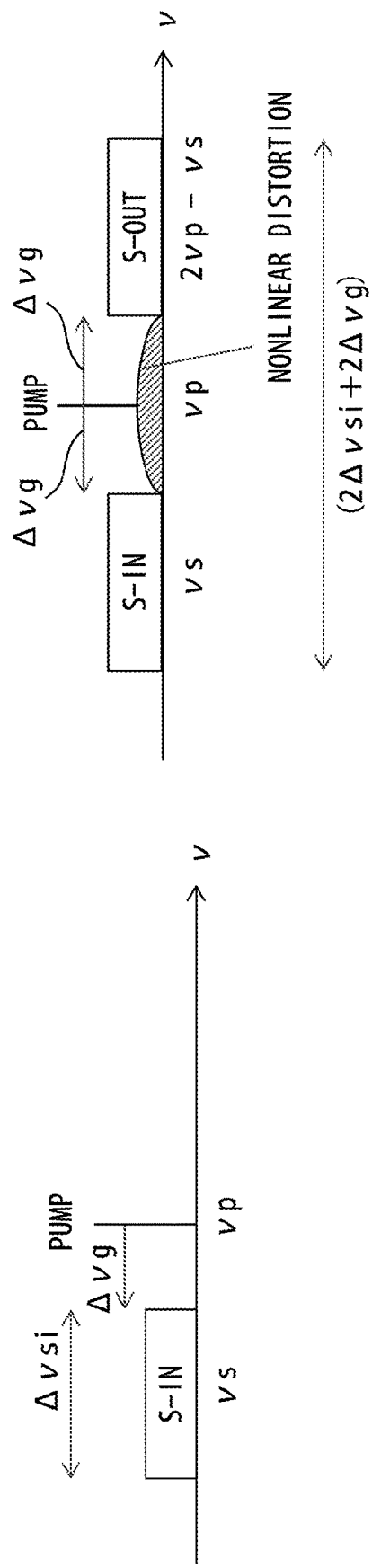
FIG. 3B
FIG. 3C

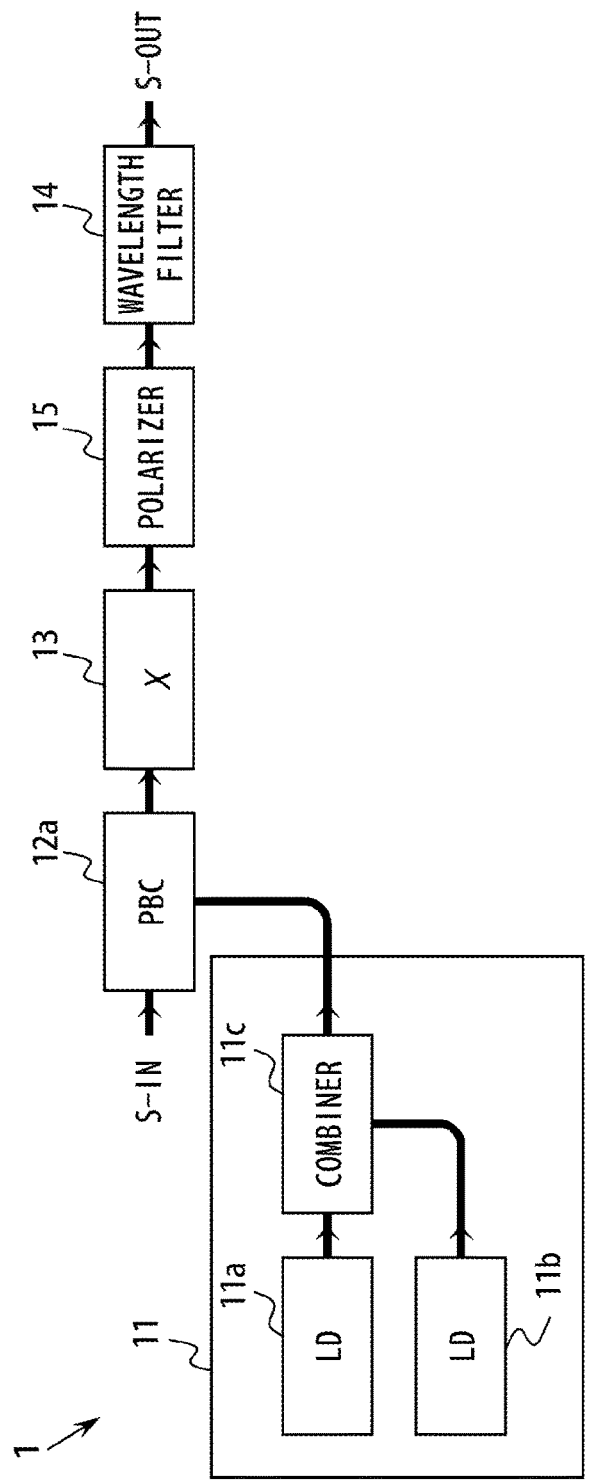
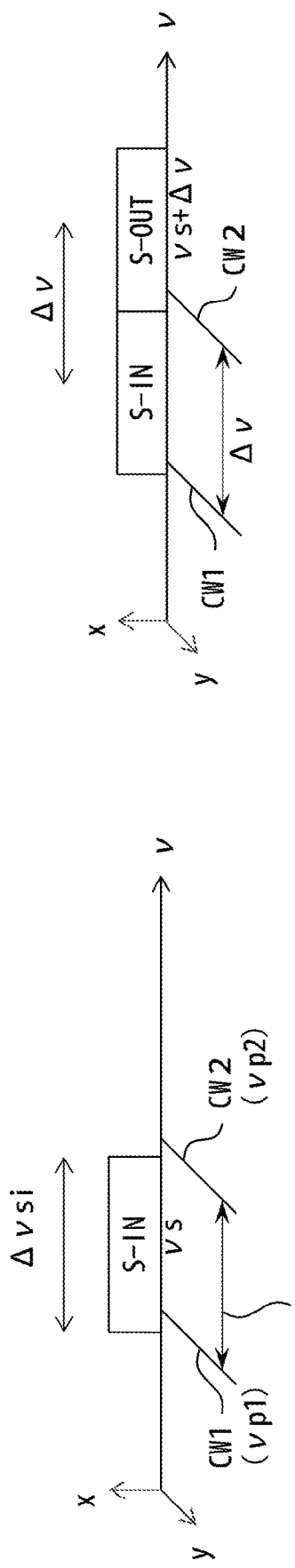
FIG. 4A
FIG. 4B
FIG. 4C

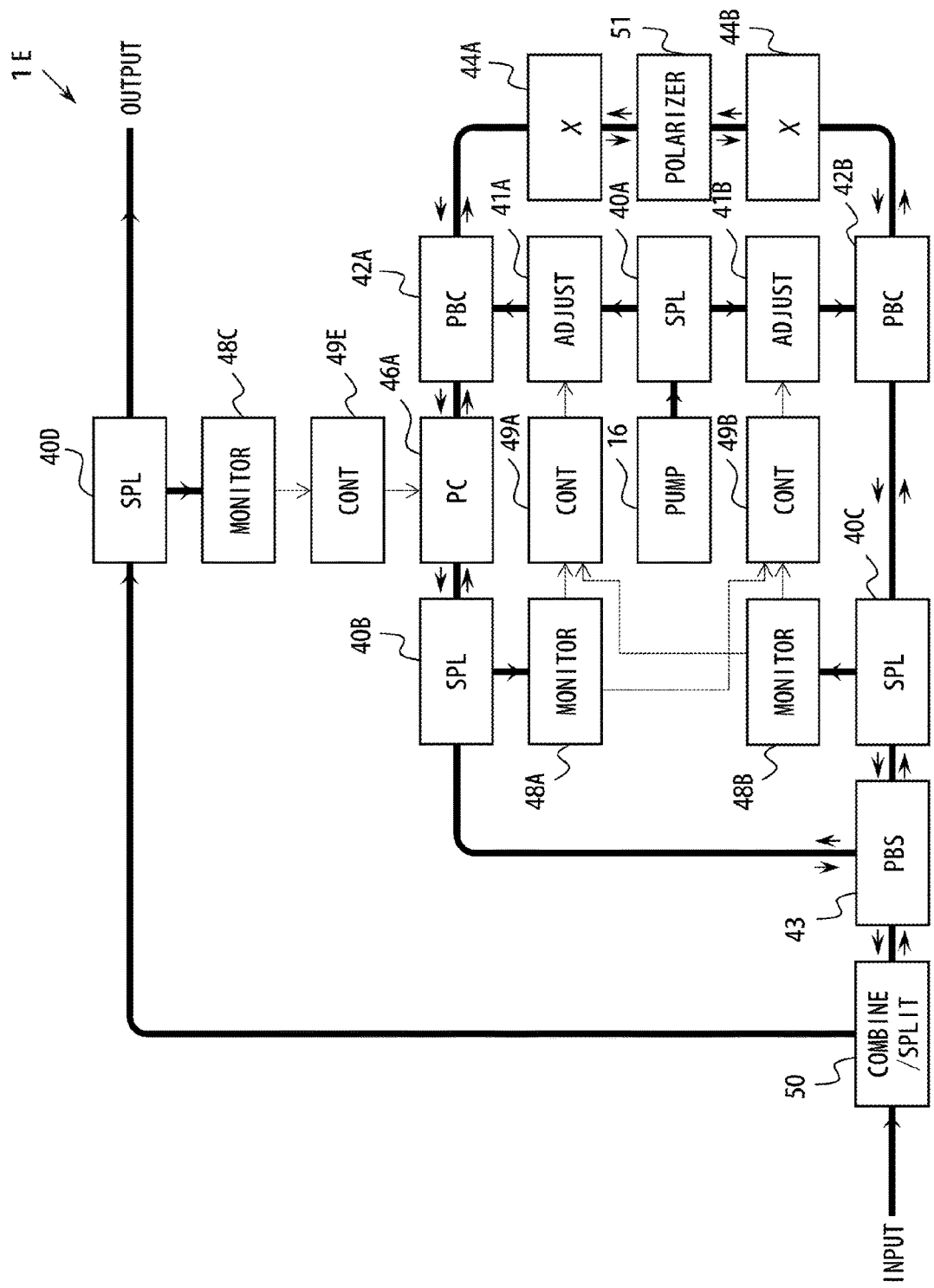
F I G. 9

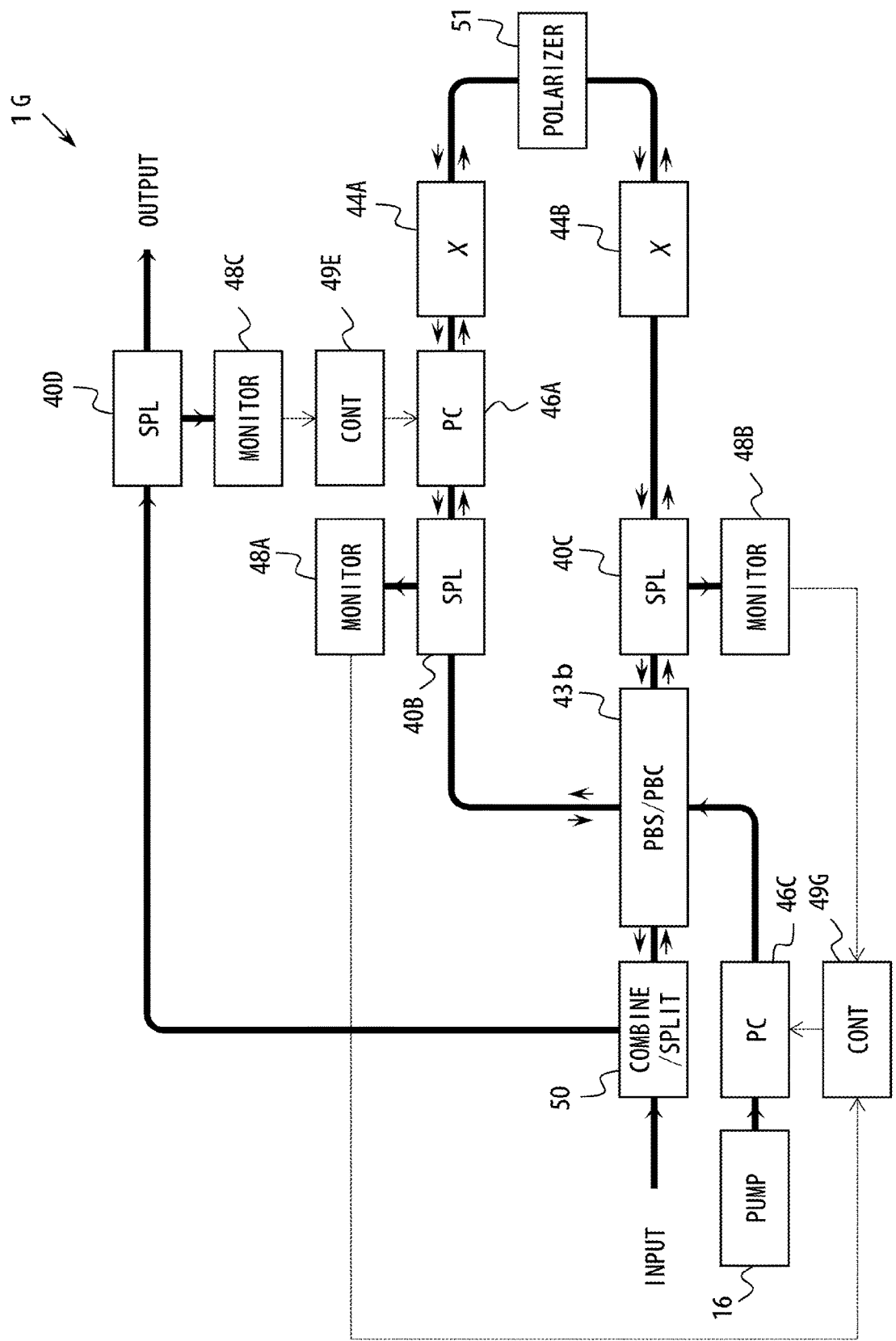
F I G. 11

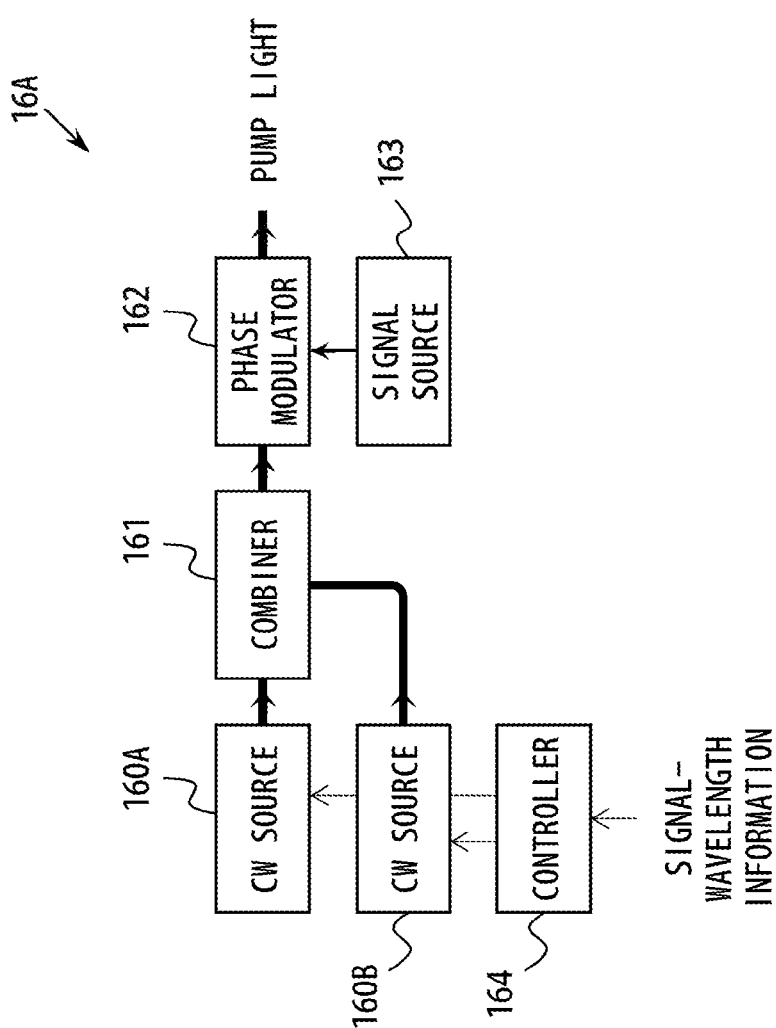
F I G. 12

WAVELENGTH CONVERTER AND OPTICAL TRANSMISSION DEVICE THAT INCLUDES WAVELENGTH CONVERTER

CROSS/REFERENCE TO RELATED APPLICATION

This application is based upon and claims the benefit of priority of the prior Japanese Patent Application No. 2017-196427, filed on Oct. 6, 2017, the entire contents of which are incorporated herein by reference.

FIELD

The embodiments discussed herein are related to a wavelength converter used in a wavelength division multiplexing network and a transmission device that includes the wavelength converter.

BACKGROUND

The recent expansion of demand for communications is also demanding increased transmission capacities. Efforts such as for example increasing the number of optical-fiber cores in a cable, increasing the optical-signal capacity per wavelength, and increasing the number of Wavelength Division Multiplexing (WDM) channels would increase the transmission capacities. However, it is demanded that transmission capacities be increased through increased optical-signal capacities, an increased number of WDM channels, etc. and without increasing the number of optical-fiber cores mainly because of the cost for laying optical fibers.

An optical transmission device transmits a signal by using for example an optical wavelength in the C (Conventional) band, which ranges from 1530 nm to 1565 nm. However, the transmission capacity can be increased only to a limited level in communications that uses the C band alone.

In view of this, a network is proposed that utilizes a wavelength conversion for freely converting the carrier optical wavelength in a transmission line in order to improve the flexibility of the network while increasing the transmission capacity. In some other cases, the transmission capacity for an optical transmission device is further increased through the utilization of communication bands including, in addition to the C band, the L (Long) band of a long wavelength domain, which ranges from 1565 nm to 1625 nm, and an S (Short) band of a short wavelength domain, which ranges from 1460 nm to 1530 nm.

Related techniques are disclosed in Japanese Laid-open Patent Publication No. 4-136823, Japanese Laid-open Patent Publication No. 2-68528, Japanese Laid-open Patent Publication No. 2008-76752, and the following document: Z. Shen, H. Hasegawa, and K. Sato, "Effectiveness of wavelength/waveband conversion and allowable cost bound evaluation for hierarchical optical path networks," IEEE-OSA Journal of Optical Communications and Networking (JOCN), vol. 5, no. 11, pp. 1262-1274, November 2013.

A technique of a wavelength conversion may be used to increase a transmission capacity in some cases. A technique of a wavelength conversion may be implemented by using optical-electrical-optical conversion, optical vector modulator, nonlinear optical medium, or the like. However, optical-electrical-optical conversion involves dependency on the modulation format for the optical signals, an example of which is the need to be provided with a different circuit in response to a change of the modulation format for the optical signals, and sometimes consumes more power as the capacity of an optical signal increases. Also, the modulation band in which a wavelength can be performed a wavelength conversion utilizing an optical vector modulator is limited. This sometimes makes it difficult for a configuration using an optical vector modulator to perform for example a wavelength conversion to a different wavelength grid.

A wavelength conversion using a nonlinear optical medium, by contrast, can collectively convert a plurality of optical signals into desired wavelengths regardless of the modulation format or wavelength of the optical signals.

However, it is desirable that a system that transmits a Wavelength Division Multiplexing (WDM) optical signal provide a wavelength conversion on a plurality of optical signals in the WDM optical signal with uniform efficiency. The efficiency of this wavelength conversion depends on the dispersion characteristic of the nonlinear optical medium. However, the dispersion characteristic of a nonlinear optical medium depends on the wavelength, which makes it difficult for the conventional techniques to perform a wavelength conversion over a wide wavelength range with uniform efficiency. This is one factor that prevents an increase in the capacity of WDM optical signals.

SUMMARY

According to an aspect of the present invention, an optical transmission device transmits wavelength multiplexed light to a transmission line. The optical transmission device includes: a first wavelength multiplexer configured to multiplex a plurality of optical signals in a first wavelength band to generate first wavelength multiplexed light; a second wavelength multiplexer configured to multiplex a plurality of optical signals in the first wavelength band to generate second wavelength multiplexed light in a first polarization; a wavelength converter configured to convert a wavelength of the second wavelength multiplexed light from the first wavelength band into a second wavelength band by a cross phase modulation among the second wavelength multiplexed light, first pump light in a second polarization, and second pump light in the second polarization, the second polarization being orthogonal to the first polarization, and a wavelength of the second pump light being different from a wavelength of the first pump light; and a third wavelength multiplexer configured to multiplex the second wavelength multiplexed light whose wavelength has been converted by the wavelength converter and the first wavelength multiplexed light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an operation of a wavelength converter;

FIG. 2 illustrates an example of an optical transmission system including an optical transmission device of the present embodiment;

FIG. 3A through FIG. 3C illustrate an example of a wavelength conversion utilizing a nonlinear optical medium;

FIG. 4A through FIG. 4C illustrate an example of a wavelength conversion through nondegenerate four-wave mixing;

FIG. 9 illustrates an example of a wavelength converter of the fifth example;

FIG. 11 illustrates an example of a wavelength converter of the seventh example;

FIG. 12 illustrates an example of a pump light source; and

DESCRIPTION OF EMBODIMENTS

Figure 5:
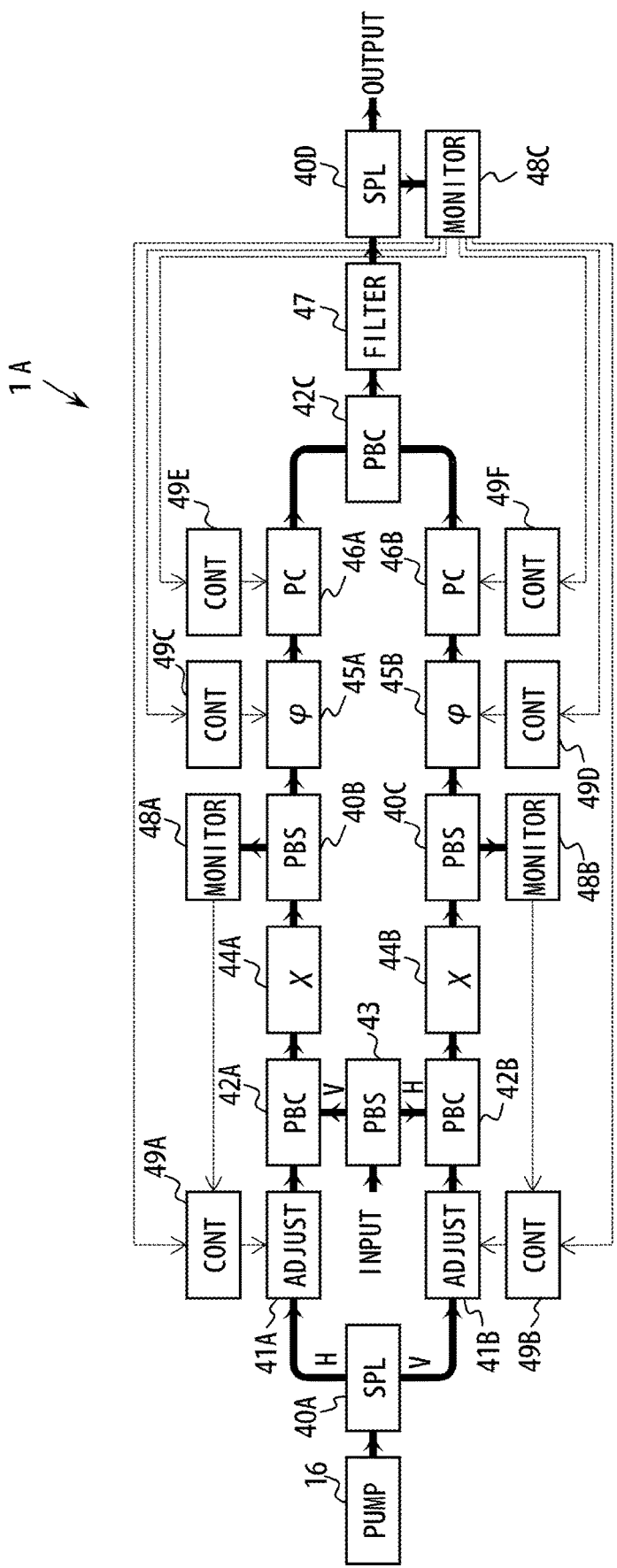
FIG. 5 illustrates an example of a wavelength converter of the first example.

FIG. 1 illustrates an example of an operation of a wavelength converter. In FIG. 1, an optical add/drop multiplexer 100 includes a wavelength converter 1 that performs a wavelength conversion by using a nonlinear optical medium.

In FIG. 1, it is assumed that a WDM optical signal is input to the first wavelength selective switch (WSS). This WDM optical signal contains optical signals a, b, c, and d with the frequencies of ν1, ν2, ν4, ν6, respectively. The first wavelength selective switch guides optical signals a and b to the second wavelength selective switch, guides optical signal c to the wavelength converter 1, and drops optical signal d. The wavelength converter 1 converts the frequency of optical signal c from ν4 to ν3. Optical signal e with the frequency of ν4 is input to the optical add/drop multiplexer 100. The second wavelength selective switch combines optical signals a, b, c, and e with the frequencies of ν1, ν2, ν3, and ν4, and outputs a WDM optical signal containing these signals.

FIG. 2 illustrates an example of an optical transmission system including an optical transmission device 2 of the present embodiment. The optical transmission device 2 of the present embodiment includes an optical transmitter 20 and an optical receiver 21. FIG. 2 schematically illustrates a case where one of the two optical transmission devices 2 includes the optical transmitter 20 while the other includes the optical receiver 21, and the optical transmitter 20 transmits an optical signal to the optical receiver 21.

The optical transmitter 20 includes a plurality of C-band transmitters 200a, a plurality of C-band transmitters 200b, a plurality of C-band transmitters 200c, C-band wavelength combiners 201a through 201c, C-band optical amplifiers 202a through 202c, C/L wavelength converter $1_{CL}$, C/S wavelength converter $1_{CS}$, and a wavelength combiner 203. The optical transmitter 20 may include other circuits or functions.

Each of the C-band transmitters 200a through 200c generates an optical signal of a wavelength in the C band, which ranges from 1530 nm to 1565 nm. The plurality of C-band transmitters 200a generate optical signals of wavelengths that are different from the others. Similarly, the plurality of C-band transmitters 200b generate optical signals of wavelengths that are different from the others, and the plurality of C-band transmitters 200c as well generate optical signals of wavelengths that are different from the others.

The C-band wavelength combiner 201a combines the optical signals generated by the plurality of C-band transmitters 200a. The C-band wavelength combiner 201b combines the optical signals generated by the plurality of C-band transmitters 200b. The C-band wavelength combiner 201c combines the optical signals generated by the plurality of C-band transmitters 200c.

The C-band wavelength combiner 201b is an example of a first wavelength multiplexer. Light output from the first wavelength multiplexer is guided to the transmission line 3 without being wavelength converted. The C-band wavelength combiners 201a and 201c are examples of a second wavelength multiplexer. The light output from each of the second wavelength multiplexers is guided to the transmission line 3 after being wavelength converted.

The C-band optical amplifiers 202a through 202c amplify optical signals respectively output from the C-band wavelength combiners 201a through 201c. The C-band optical amplifiers 202a through 202c can respectively amplify light in the C band efficiently. The optical signal amplified by the C-band optical amplifier 202a is guided to the C/L wavelength converter $1_{CL}$, and the optical signal amplified by the C-band optical amplifier 202c is guided to the C/S wavelength converter $1_{CS}$.

The C/L wavelength converter $1_{CL}$, and the C/S wavelength converter $1_{CS}$ are examples of the above wavelength converter 1. The C/L wavelength converter $1_{CL}$ converts an optical signal of a wavelength in the C band (which will be also referred to as a C-band optical signal) into an optical signal of a wavelength in the L band (which will be also referred to as an L-band optical signal). The C/S wavelength converter $1_{CS}$ converts a C-band optical signal into an optical signal of a wavelength in the S band (which will be also referred to as an S-band optical signal). The optical signals respectively output from the C/L wavelength converter $1_{CL}$ and the C/S wavelength converter $1_{CS}$ are guided to the wavelength combiner 203.

The wavelength combiner 203 combines the L-band optical signal received from the C/L wavelength converter $1_{CL}$, the C-band optical signal received from the C-band optical amplifier 202b, and the S-band optical signal received from the C/S wavelength converter $1_{CS}$. The optical signal resulting from the combining by the wavelength combiner 203 is transmitted to the optical receiver 21 through the transmission line 3. This optical signal contains an L-band optical signal, a C-band optical signal, and an S-band optical signal as illustrated in FIG. 2. Note that the wavelength combiner 203 is an example of a third wavelength multiplexer.

The optical receiver 21 includes a wavelength splitter 210, L/C wavelength converter $1_{LC}$, S/C wavelength converter $1_{SC}$, C-band optical amplifiers 211a through 211c, C-band wavelength splitters 212a through 212c, a plurality of C-band receivers 213a, a plurality of C-band receivers 213b, and a plurality of C-band receivers 213c.

The wavelength splitter 210 splits the L-band optical signal, the C-band optical signal, and the S-band optical signal from the others, these three signals being contained in the received optical signal. The L-band optical signal is guided to the L/C wavelength converter $1_{LC}$, the C-band optical signal is guided to the C-band optical amplifier 211, and the S-band optical signal is guided to the L/C wavelength converter $L_{SC}$.

The L/C wavelength converter $1_{LC}$ and the S/C wavelength converter $1_{SC}$ are examples of the above wavelength converter 1. The L/C wavelength converter $1_{LC}$ converts the L-band optical signal received from the wavelength splitter 210 into a C-band optical signal. The S/C wavelength converter $1_{SC}$ converts the S-band optical signal received from the wavelength splitter 210 into a C-band optical signal.

The C-band optical amplifier 211a amplifies an optical signal, received from the L/C wavelength converter $1_{LC}$, that has been wavelength converted. The C-band optical amplifier 211b amplifies an optical signal received from the wavelength splitter 210. The C-band optical amplifier 211c amplifies an optical signal, received from the S/C wavelength converter $1_{SC}$, that has been wavelength converted. The optical signals output from the C-band optical amplifiers 211a through 211c are respectively guided to the C-band wavelength splitters 212a through 212c.

Each of the C-band wavelength splitters 212a through 212c splits optical signals in the C band for each wavelength. The optical signals obtained through the splitting by the C-band wavelength splitter 212a are guided to the plurality of C-band receivers 213a. Similarly, the optical signals obtained through the splitting by the C-band wavelength splitter 212b are guided to the plurality of C-band receivers 213b, and the optical signals obtained through the splitting by the C-band wavelength splitter 212c are guided to the plurality of C-band receivers 213c.

While the above optical transmission device 2 includes the C-band transmitters 200a-200c that perform operations including the generation of a C-band optical signal, the optical transmission device 2 may include, instead of or in addition to the C-band transmitters 200a-200c, a transmitter that generates an optical signal in a different band such as an L-band. In this case, the optical transmitter 20 includes the wavelength converter 1 that converts an L-band optical signal into an optical signal of a wavelength in a different band. In addition, the optical transmitter 20 may include an L-band wavelength combiner instead of or in addition to the C-band wavelength combiner 201.

While the above optical transmitter 20 can transmit optical signals of wavelengths in the C band, the S band, and the L band, the optical transmitter 20 may transmit for example optical signals in the C band and the S band. While the above optical receiver 21 includes the C-band receivers 213a-213c that receive C-band optical signals, the optical receiver 21 may include, instead of or in addition to the C-band receivers 213a-213c, for example an L-band receiver that receives an L-band optical signal. In such a case, the optical receiver 21 may include the wavelength converter 1 that converts an optical signal of a wavelength in the C band or the S band into an optical signal of a wavelength in the L band.

Each of the above optical transmission devices 2 can transmit and receive information through an optical signal even when the optical transmitter or the optical receiver processes an optical signal in a single wavelength band but does not process optical signals in other wavelength bands. A simpler internal configuration can be achieved for the optical transmission devices 2 having a configuration such as this because it only needs to include an optical transmitter or an optical receiver that responds to an optical signal of a wavelength in a specific band.

FIG. 3A through FIG. 3C illustrate an example of a wavelength conversion utilizing a nonlinear optical medium. The wavelength converter 1 in FIG. 3A includes a polarization stabilizer 10, a pump light generator 11, an optical combiner 12, a nonlinear optical medium 13, a wavelength filter 14, etc. in this example. Hereinafter, a pump light generator may be referred to as a pump light source.

The wavelength converter 1 receives signal light. The signal light carries a signal.

The polarization stabilizer 10 stabilizes the polarization of the input signal light. The polarization stabilizer 10 may control the polarization of the input signal light such that the polarization of the signal light is orthogonal to the polarization of pump light output from the pump light generator 11.

The pump light generator 11 generates pump light. The pump light generator 11 may control the polarization of the pump light such that the polarization of the pump light is orthogonal to the polarization of the input signal light.

The optical combiner 12 combines the input signal light and the pump light. The optical combiner 12 may control the polarizations of the input signal light and the pump light such that these polarizations are orthogonal to each other.

A functional unit or a set of functional units that control or adjust signal light and/or pump light such that the polarizations of the signal light and the pump light are orthogonal to each other may be referred to as a polarization adjustment unit.

The nonlinear optical medium 13 generates idler light by a cross phase modulation between the signal light and pump light received from the optical combiner 12. Note that the idler light contains a modulation component identical to that of the signal light input to the wavelength converter 1. This idler light may be referred to as wavelength converted signal light.

The wavelength filter 14 transmits signal light of a wavelength in a specific band. In this example, the wavelength filter 14 transmits the above idler light, and blocks the input signal light and the pump light. The wavelength converter 1 outputs the light (idler light) that has been transmitted through the wavelength filter 14. This signal light output from the wavelength converter 1 may be referred to as output signal light.

Note that the wavelength filter 14 may transmit light of a wavelength in the L band when for example signal light having a wavelength in the C band is input to the wavelength converter 1 and the above idler light has a wavelength in for example the L band. As described above, output signal light is in a wavelength band different from that of the input signal light so that the wavelength filter 14 transmits light of a wavelength in the wavelength band of the output signal light and blocks the other wavelengths, and thereby the output signal light can be extracted.

Also, the wavelength converter 1 may include a polarizer that allows the transmission of light in the same polarization as the polarization of the output signal light and does not allow the transmission of light in a polarization orthogonal to the polarization of the output signal light, on the output side of the nonlinear optical medium 13. This can prevent the pump light from being output together with the output signal light.

It is assumed as illustrated in FIG. 3B that input signal light (S-IN) has a bandwidth of $\Delta vsi$. It is also assumed that the frequency of $vp$ of pump light (PUMP) is shifted by $\Delta vg$ from the edge of the band of the input signal light. Note that the wavelength converter 1 illustrated in FIG. 3 performs a wavelength conversion that utilizes degenerate four-wave mixing.

When the nonlinear optical medium 13 receives the input signal light and the pump light, idler light (S-OUT) corresponding to the signal light is generated through a cross phase modulation as illustrated in FIG. 3C. In this generation, the idler light is generated in such a manner that the frequency difference between the input signal light and the pump light is equal to the frequency difference between the idler light and the pump light. Then, the wavelength filter 14 extracts this idler light as output signal light.

In this case, when the wavelength of the pump light is close to the zero dispersion wavelength of the nonlinear optical medium 13, it is easier to achieve uniform efficiency in a region around the wavelength of the pump light. Meanwhile, a frequency gap of $2\Delta vvg$ emerges between the input signal light and the output signal light. This means that a reduction in the frequency gap of $2\Delta vg$ may lead to roughly uniform efficiency.

It is desired in this situation that a signal frequency range that includes a frequency range of the input signal light, a frequency range of the output signal light and a frequency range between the input signal light and the output signal light be narrow. In the example illustrated in FIG. 3C, the signal frequency range has a width of $2\Delta vsi+2\Delta vg$. In addition, it is desirable that the signal frequency range is arranged within the low dispersion wavelength range of the nonlinear optical medium. Note that a "low dispersion wavelength domain" refers to a wavelength range with low wavelength dispersion in the nonlinear optical medium.

While the signal frequency range is desirably narrow, a small $\Delta vg$ would increase the possibility that the pump light will be modulated by the input signal light, which causes a nonlinear distortion, and the wavelength component of this nonlinear distortion is superposed on the wavelength component of the output signal light, deteriorating the quality of the output signal light.

To avoid such a situation, the wavelength converter 1 of the present embodiment controls the polarization of at least either input signal light or pump light such that the polarization of the input signal light and the polarization of the pump light are orthogonal to each other. The polarizations of input signal light and pump light adjusted to be orthogonal to each other suppresses a modulation of the pump light caused by the input signal light and also suppresses a nonlinear distortion illustrated in FIG. 3C. This eliminates the need to provide a wavelength gap between the input signal light and the pump light and enables a wavelength conversion close to the wavelength of the pump light, achieving a roughly uniform wavelength conversion.

The frequency of output signal light may overlap the frequency of input signal light when the frequency of the pump light overlaps the frequency of the input signal light in degenerate four-wave mixing. Because this overlapping may prevent the wavelength filter 14 from extracting the output signal light separated from the input signal light, deteriorating the output signal light, the frequency of pump light is close to, but does not overlap, the frequency of the input signal light.

FIG. 4A through FIG. 4C illustrate an example of a wavelength conversion through nondegenerate four-wave mixing. The wavelength converter 1 includes the pump light generator 11, a polarization beam combiner 12a, the nonlinear optical medium 13, a polarizer 15, the wavelength filter 14 as illustrated in FIG. 4A. The pump light generator 11 includes light sources 11a and 11b and an optical combiner 11c. The light sources 11a and 11b generate continuous wave light (CW1 and CW2) of different wavelengths. The optical combiner 11c combines CW1 and CW2. The combined CW1 and CW2 are used as pump light. Also, at least either CW1 or CW2 may have its polarization adjusted such that CW1 and CW2 are in the same polarization. The optical combiner 11c may be provided outside the pump light generator 11.

The polarization beam combiner (PBC) 12a combines signal light and pump light that is received from the pump light generator 11. In the combining, the polarization beam combiner 12a combines the signal light and the pump light such that the polarization of the signal light and the polarization of the pump light are orthogonal to each other. In other words, the polarization beam combiner 12a may function as a polarization adjustment unit. Despite the above configuration, the polarizations of the signal light and the pump light may be controlled, prior to the control by the polarization beam combiner 12a, such that they are orthogonal to each other. For example, the pump light generator 11 may obtain information on the polarization state of the input signal light so that the optical combiner 11c, according to this information, controls the polarizations of the pump light such that it is orthogonal to the polarization of the input signal light. In that case, the optical combiner 11c may function as a polarization adjustment unit.

The nonlinear optical medium 13 receives the signal light and the pump light whose polarizations are orthogonal to each other, and idler light is generated by a cross phase modulation. The polarization of this idler light is parallel to the polarization of the input signal light, and is orthogonal to the polarization of the pump light. Similarly to the case explained in FIG. 3, this idler light contains a modulation component identical to the data modulation component of the input signal light, and the idler light is extracted as output signal light so that the data is transmitted.

From among the beams of light received from the nonlinear optical medium 13, the polarizer 15 transmits light in the same polarization as the polarization of the idler light and blocks light in a polarization orthogonal to the polarization of the idler light. This polarizer 15 can prevent the pump light from being output together with the output signal light.

The wavelength filter 14 transmits light of a wavelength in the wavelength band of the output signal light and blocks light of a wavelength in the wavelength band of the input signal light. Thus the input signal light is blocked and the output signal light is extracted.

FIG. 4B and FIG. 4C illustrate input signal light (S-IN), output signal light (S-OUT), and pump light (CW1 and CW2) of the wavelength converter 1 illustrated in FIG. 4A. It is assumed that the center frequency and the bandwidth of the input signal light are $vs$ and $\Delta vsi$, respectively, and the input signal light is in a polarization in the x direction.

The pump light contains CW1 and CW2. CW1 and CW2 respectively have frequencies of $vp1$ and $vp2$. It is assumed as illustrated in FIG. 4B that CW1 and CW2 are respectively in polarizations that are in the y direction, which is orthogonal to the x direction. This example satisfies $vp1<vp2$. Then, the frequency difference $\Delta v$ between CW1 and CW2 is expressed by $vp2-vp1$.

When signal light S-IN, CW1 and CW2 are input to the nonlinear optical medium 13, idler light (S-OUT) is generated by a cross phase modulation as illustrated in FIG. 4C. This idler light has a frequency of $vs+\Delta v$, which is a value resulting from shifting the frequency of $vs$ of the input signal light by frequency difference $\Delta v$ between the two beams of the pump light. Also, this idler light is in a polarization in the x direction similarly to the input signal light. As described above, this idler light has a modulation component identical to the data modulation component of the input signal light, and the idler light is extracted as output signal light so that the desired data can be transmitted.

As described above, the greater $\Delta v$ is, the greater the difference is between the wavelengths of the input signal light and the output signal light, increasing the possibility that the output signal light will have a group velocity greatly different from that of the input signal light. Thus, a configuration with larger $\Delta v$ is not desirable.

However, the wavelength converter 1 of the present embodiment may perform a wavelength conversion to a different signal band, including for example a conversion of the wavelength band of input signal light into a wavelength in the L band from a wavelength in the C band. Because of this, $\Delta v$ has to be greater than or equal to $\Delta vsi$ when the input signal light is considered to have a frequency width equal to the frequency range occupied by one band. Also, output signal light needs to have a frequency not overlapping that of the input signal light in order to allow the wavelength filter 14 to extract the output signal light by splitting it from the input signal light. For these reasons, the frequency difference between CW1 and CW2 is desirably greater than or equal to the width of the frequency of the input signal light.

Thus, if $\Delta v$ is equal to $\Delta vsi$, a width of the signal frequency range is $2\Delta vsi$. Note that the signal frequency range is desirably within the low dispersion wavelength range of the nonlinear optical medium 13.

Because the polarizations of the pump light (CW1 and CW2) are orthogonal to the polarization of the input signal light, the modulation from the input signal light to the pump light does not cause a great influence and great deterioration in the output signal light. Thus, the wavelength of the pump light may overlap that of the input signal light.

Explanations based on drawings will hereinafter be given for a specific example of the wavelength converter 1 that makes it possible to narrow the signal wavelength range and to perform a wavelength conversion into a different band by adjusting the polarizations of the pump light and the input signal light to be orthogonal to each other and inputting these beams of light to a nonlinear optical medium.

First Example

FIG. 5 illustrates an example of a wavelength converter of the first example. It is assumed in the present example that input signal light is polarization multiplexed light. A wavelength converter 1A includes a pump light generator 16, optical splitters 40A, 40B, 40C, and 40D, optical intensity adjusters 41A and 41B, polarization beam combiners 42A, 42B, and 42C, a polarization beam splitter 43, nonlinear optical media 44A and 44B, etc. The wavelength converter 1A further includes optical phase adjusters 45A and 45B, polarization controllers 46A and 46B, the optical filter (wavelength filter) 47, monitors 48A, 48B, and 48C, and controllers 49A, 49B, 49C, 49D, 49E, and 49F, and etc.

The pump light generator 16 corresponds to the above pump light generator 11. However, it is assumed in this example that nondegenerate four-wave mixing is performed and that the pump light generator 16 corresponds to the pump light generator 11 illustrated in FIG. 4A. However, the embodiments are not limited to this example.

The pump light generator 16 generates four beams of pump light (these beams of the pump light are respectively assumed to be continuous wave light and will be hereinafter referred to as CW1, CW2, CW3, and CW4), and outputs them to the optical splitter 40A. The frequency difference between CW1 and CW2 and the frequency difference between CW3 and CW4 are respectively greater than or equal to the frequency width of the input signal light. While these differences are substantially the same as each other in the present embodiment, the present invention is not limited to this embodiment. Each of the frequencies of CW1-CW4 may be within the frequency range of the input signal light. It is assumed in this example that CW1 and CW2 are in horizontal polarizations and CW3 and CW4 are in vertical polarizations. Note that when the nonlinear optical media 44A and 44B cause degenerate four-wave mixing, the frequencies of CW1 and CW2 are equal to each other and the frequencies of CW3 and CW4 are also equal to each other. In that case, CW1 through CW4 are assumed to have equal frequencies in the present embodiment. It is also assumed that these frequencies do not overlap the frequency range of the input signal light but are close to it.

The optical splitter 40A splits the pump light received from the pump light generator 16, outputs CW1 and CW2 to the optical intensity adjuster 41A, and outputs the CW3 and CW4 to the optical intensity adjuster 41B.

In accordance with an instruction from the controller 49A, the optical intensity adjuster 41A adjusts the optical intensities of CW1 and CW2 and outputs the resultant beams of light to the polarization beam combiner 42A.

In accordance with an instruction from the controller 49B, the optical intensity adjuster 41B adjusts the optical intensities of CW3 and CW4 and outputs the resultant beams of light to the polarization beam combiner 42B.

The polarization beam splitter 43 splits the input signal light of the first frequency into its vertical-polarization component and horizontal-polarization component. It is assumed that the width of the first frequency corresponds to for example one wavelength band and is a width that does not change the group velocity after wavelength conversions in the nonlinear optical media 44A and 44B. The polarization beam splitter 43 outputs the vertical-polarization component of the input signal light to the polarization beam combiner 42A, and outputs the horizontal-polarization component of the input signal light to the polarization beam combiner 42B.

The polarization beam combiner 42A combines the vertical-polarization component of the input signal light and the pump light (CW1 and CW2) such that the polarizations of the vertical-polarization component of the input signal light and the pump light are orthogonal to each other. Note that CW1 and CW2 are in horizontal polarizations as described above. Then, the vertical-polarization component of the input signal light and the pump light (CW1 and CW2) combined by the polarization beam combiner 42A are guided to the nonlinear optical medium 44A. In this example, the polarization beam combiner 42A corresponds to the polarization adjustment unit. Note that the polarization beam splitter 43 corresponds to the polarization adjustment unit when the polarization beam splitter 43 appropriately splits the input signal light.

The nonlinear optical media 44A and 44B may be implemented by various materials including for example an optical fiber, a periodic-polarization electro-optic crystal, and a high-index-contrast waveguide utilizing silicon or a composite semiconductor.

The nonlinear optical medium 44A performs a cross phase modulation on the vertical-polarization component of the input signal light with the pump light (CW1 and CW2), and thereby generates signal light (which will be also referred to as wavelength converted signal light) that has received a wavelength conversion of a second frequency so as to output this wavelength converted signal light to the optical splitter 40B. The value of the second frequency is obtained by shifting the first frequency by the frequency difference between CW1 and CW2. It is assumed that this difference is greater than or equal to the frequency width of the input signal light. When this difference is equal to the width of one frequency band and a width of a frequency range of the input signal light is equivalent to this frequency band, a cross phase modulation using CW1 and CW2 will convert the frequency band of the input signal light into a different frequency band.

The light output from the nonlinear optical medium 44A may pass through a polarizer (not illustrated) before being input to the optical splitter 40B. In this case, this polarizer is configured to transmit light in a polarization in the same direction as the polarization of the wavelength converted signal light generated in the nonlinear optical medium 44A. For example, when the wavelength converted signal light generated in the nonlinear optical medium 44A is in a vertical polarization, the polarizer transmits light in a vertical polarization and blocks light in a horizontal polarization. A polarizer such as this allows wavelength converted signal light to be input to the optical splitter 40B and prohibits the input of the pump light.

The optical splitter 40B splits the light received from the nonlinear optical medium 44A, outputs one of the resultant beams to the optical phase adjuster 45A, and outputs the other to the monitor 48A.

In accordance with an instruction from the controller 49C, the optical phase adjuster 45A adjusts the phase of the light received from the optical splitter 40B, and outputs the adjusted light to the polarization controller 46A.

In accordance with an instruction from the controller 49E, the polarization controller 46A adjusts the polarization state of the light received from the optical phase adjuster 45A, and outputs the adjusted light to the polarization beam combiner 42C.

Similarly to the polarization beam combiner 42A, the polarization beam combiner 42B combines the horizontal-polarization component of the input signal light and the pump light (CW3 and CW4) such that polarizations of the horizontal-polarization component of the input light and the pump light are orthogonal to each other. As described above, CW3 and CW4 are in vertical polarizations. Then, the horizontal-polarization component of the input signal light and the pump light (CW3 and CW4) combined by the polarization beam combiner 42B are guided to the nonlinear optical medium 44B. Note that the polarization beam combiner 42B of the present example corresponds to the polarization adjustment unit similarly to the polarization beam combiner 42A.

The nonlinear optical medium 44B performs a cross phase modulation on the horizontal-polarization component of the input signal light with the pump light, and thereby generates wavelength converted signal light of the second frequency so as to output this wavelength converted signal light to the optical splitter 40C. The value of the second frequency is obtained by shifting the first frequency by the different between CW3 and CW4 (which is substantially the same as the difference between CW1 and CW2). This difference is greater than or equal to the frequency width of the input signal light.

Similarly to the light output from the nonlinear optical medium 44A, the light output from the nonlinear optical medium 44B may pass through a polarizer (not illustrated) before being input to the optical splitter 40C. This polarizer is configured to transmit light in a polarization in the same direction as the polarization of the wavelength converted signal light generated in the nonlinear optical medium 44B. This allows wavelength converted signal light to be input to the optical splitter 40C and prohibits the input of pump light.

The optical splitter 40C splits the light received from the nonlinear optical medium 44B, outputs one of the resultant beams to the optical phase adjuster 45B, and outputs the other to the monitor 48B.

In accordance with an instruction from the controller 49D, the optical phase adjuster 45B adjusts the phase of the light received from the optical splitter 40C, and outputs the adjusted light to the polarization controller 46B.

In accordance with an instruction from the controller 49F, the polarization controller 46B adjusts the polarization state of the light received from the optical phase adjuster 45B, and outputs the adjusted light to the polarization beam combiner 42C.

The polarization beam combiner 42C combines the beams of the wavelength converted signal light respectively received from the polarization controllers 46A and 46B such that the polarizations of the two beams are orthogonal to each other, and outputs the resultant light to the optical filter 47. The polarization beam combiner 42C blocks the pump light output from the polarization controllers 46A and 46B. Specifically, the polarization beam combiner 42C extracts the vertical-polarization component from the light received from the polarization controller 46A and executes the horizontal-polarization component of the light received from the polarization controller 46B so as to combine these components.

The optical filter 47 prevents the transmission of input signal light of the first frequency and transmits wavelength converted signal light of the second frequency. The optical filter 47 transmits a frequency range of the wavelength converted signal light including the second frequency, and blocks other frequency components such as a frequency range of the input signal light including the first frequency. The optical filter 47 outputs the transmitted wavelength converted signal light to the optical splitter 40D.

The optical splitter 40D splits the wavelength converted signal light received from the optical filter 47, outputs one of the resultant beams as output signal light, and outputs the other to the monitor 48C.

The monitor 48A monitors the power of the wavelength converted signal light received from the optical splitter 40B, and based on the result, generates a control signal that causes the wavelength converted signal light to have a desirable, such as maximum for example, value as its power so as to output the control signal to the controller 49A.

The monitor 48B monitors the power of the wavelength converted signal light received from the optical splitter 40C, and based on the result, generates a control signal that causes the wavelength converted signal light to have a desirable value as its power so as to output the control signal to the controller 49B.

The monitor 48C monitors the power of the wavelength converted signal light received from the optical splitter 40D, and based on the result, generates a control signal that causes the wavelength converted signal light to have a desirable value as its power so as to output the control signal to the controllers 49A, 49B, 49C, 49D, 49E, and 49F.

In accordance with control signals from the monitor 48A and the monitor 48C, the controller 49A controls the optical intensity adjuster 41A such that desired conversion efficiency can be achieved, i.e., the wavelength converted signal light has a desired value as its power.

In accordance with control signals from the monitor 48B and the monitor 48C, the controller 49B controls the optical intensity adjuster 41B such that desired conversion efficiency can be achieved.

The controller 49C and the controller 49D respectively control the optical phase adjuster 45A and the optical phase adjuster 45B in accordance with a control signal from the monitor 48C.

The controller 49E and the controller 49F respectively control the polarization controller 46A and the polarization controller 46B in accordance with a control signal from the monitor 48C.

The wavelength converter 1A of the present example makes it possible to highly efficiently convert an optical signal into an optical signal of a different wavelength with reduced chromatic dispersion in nonlinear optical medium 44 through the sufficient narrowing of the signal frequency range while flexibly selecting the frequency of pump light by for example causing the frequency of the pump light to overlap the frequency of input signal light.

Second Example

Figure 6:
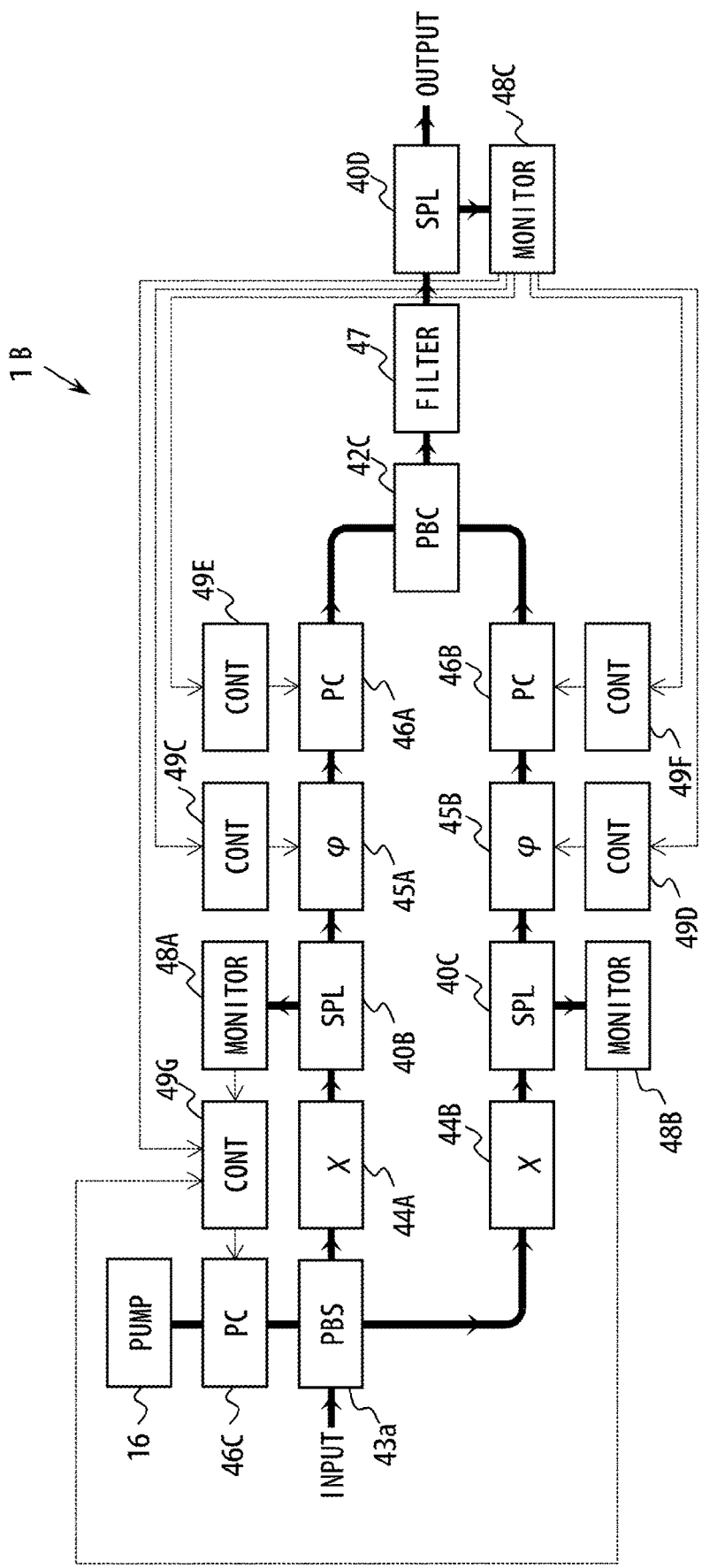
FIG. 6 illustrates an example of a wavelength converter of the second example.

FIG. 6 illustrates an example of a wavelength converter of the second example. It is assumed in the present example that the input signal light is polarization multiplexed light. A wavelength converter 1B of the present example has the configuration of the wavelength converter 1A except that it includes the following functional units instead of the optical splitter 40A, the optical intensity adjusters 41A and 41B, the controllers 49A and 49B, the polarization beam splitter 43, and the polarization beam combiners 42A and 42B. The wavelength converter 1B includes a polarization beam splitter 43a, a polarization controller 46C, and a controller 49G. The other functional units are like those in the wavelength converter 1A, are thus denoted by same symbols, and will not be explained.

While the above polarization beam splitter 43 includes three or more input/output ports, the polarization beam splitter 43a includes four or more input/output ports. The polarization beam splitter 43a receives input signal light and pump light (CW1 through CW4) respectively through two different ports from among the four or more ports. This pump light is output from the pump light generator 16 to be input to the polarization beam splitter 43a via the polarization controller 46C, which will be described later.

The polarization beam splitter 43a splits the input signal light into a vertical-polarization component and a horizontal-polarization component. The polarization beam splitter 43a combines CW1 and CW2, which are the pump light, and the vertical-polarization component of the input signal light such that the polarizations of CW1 and CW2 are orthogonal to the polarization of the vertical-polarization component of the input signal light. Similarly, the polarization beam splitter 43a combines CW3 and CW4, which are the pump light, and the horizontal-polarization component of the input signal light such that the polarizations of CW3 and CW4 are orthogonal to the polarization of the horizontal-polarization component of the input signal light. Alternatively, the polarization controller 46C, which will be described later, may perform this polarization control on the pump light. In this example, the polarization beam splitter 43a or the polarization controller 46C correspond to the polarization adjustment unit.

The polarization beam splitter 43a guides the vertical-polarization component of the input signal light, CW1, and CW2 to the nonlinear optical medium 44A, and guides the horizontal-polarization component of the input signal light, CW3, and CW4 to the nonlinear optical medium 44B.

The polarization controller 46C controls the polarization state of the pump light received from the pump light generator 16 in accordance with an instruction from the controller 49G such that the beams of the wavelength converted signal light generated in the nonlinear optical media 44A and 44B have desired intensities such as for example ones equal to each other. For example, the polarization beam splitter 43a may perform control so that the vertical-polarization component (or horizontal-polarization component) of the input signal light and the horizontal-polarization component (or vertical-polarization component) of the pump light are orthogonal to each other.

The monitor 48A monitors the power of the wavelength converted signal light received from the optical splitter 40B, and based on the result, generates a control signal that causes the wavelength converted signal light to have a desirable, such as maximum for example, value as its power so as to output the control signal to the controller 49G.

The monitor 48B monitors the power of the wavelength converted signal light received from the optical splitter 40C, and based on the result, generates a control signal that causes the wavelength converted signal light to have a desirable value as its power so as to output the control signal to the controller 49G.

The controller 49G receives control signals from the monitors 48A through 48C, and outputs, based on these control signals, an instruction to control the polarization of the pump light from the pump light source 16 to the polarization controller 46C.

The other functional units and their operations are similar to those of the wavelength converter 1A of the first example, and thus will not be explained.

In addition to the effects achieved by the first example, the wavelength converter 1B of the second example can achieve the reduction in the number of parts belonging to itself, leading to a simpler structure.

Third Example

Figure 7:
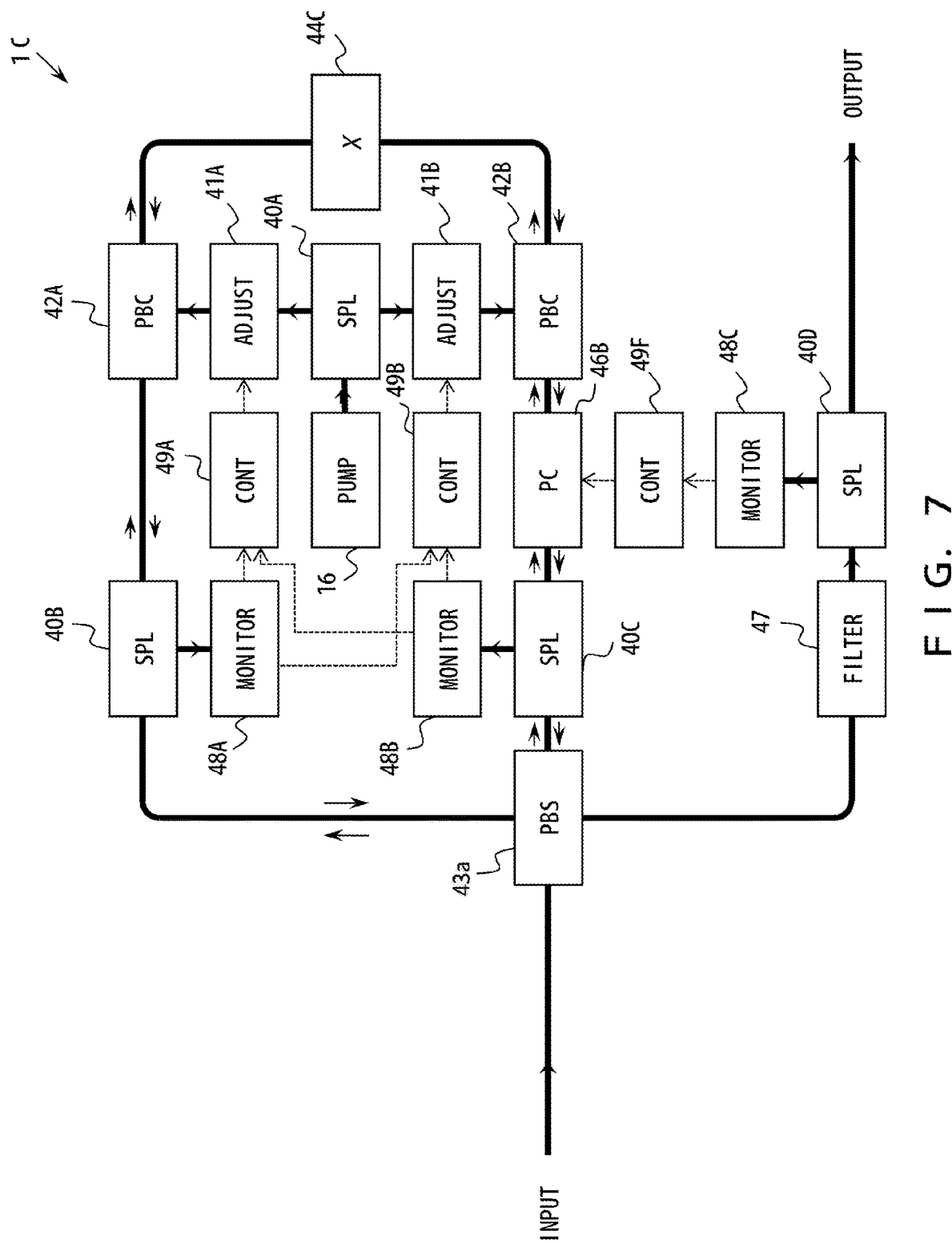
FIG. 7 illustrates an example of a wavelength converter of the third example.

FIG. 7 illustrates an example of a wavelength converter of the third example. It is assumed in the present example that the input signal light is polarization multiplexed light. A wavelength converter 1C of the present example includes the polarization beam splitter 43a, the optical splitters 40A, 40B, 40C, and 40D, the polarization controller 46B, the pump light generator 16, the optical intensity adjusters 41A and 41B, etc. The wavelength converter 1C includes the polarization beam combiners 42A and 42B, a nonlinear optical medium 44C, the optical filter 47, the monitors 48A through 48C, the controllers 49A, 49B, and 49F, and etc. Functional units that are similar to their counterparts in the first and/or second examples will not be explained unless otherwise stated.

In the third example, the vertical-polarization and horizontal-polarization components of the input signal light output from the polarization beam splitter 43a travel along a looped optical path in the opposite directions. Then, the vertical-polarization and horizontal-polarization components are respectively wavelength converted in the same nonlinear optical medium 44C. The vertical-polarization and horizontal-polarization components generated by the wavelength conversions travel along a looped optical path in the opposite directions to be guided to the polarization beam splitter 43a.

The polarization beam splitter 43a includes four input/output ports similarly to the case of the second example. However, the polarization beam splitter 43a in the third example performs polarization splitting on the input signal light, outputs the vertical-polarization component of the input signal light to the optical splitter 40B, and outputs the horizontal-polarization component of the input signal light to the optical splitter 40C. The polarization beam splitter 43a receives, from the optical splitter 40B, the wavelength converted signal light generated from the horizontal-polarization component of the input signal light. Similarly, the polarization beam splitter 43a receives, from the optical splitter 40C, the wavelength converted signal light generated from the vertical-polarization component of the input signal light. In addition, the polarization beam splitter 43a combines the beams of the wavelength converted signal light respectively output from the optical splitters 40B and 40C such that the polarizations of the two beams are orthogonal to each other, and outputs the resultant light to the optical filter 47. The polarization beam splitter 43a may block the pump light guided via the optical splitters 40B and 40C, so as not to be transmitted to the optical filter 47.

Light generated by the nonlinear optical medium 44C is input to each of the optical splitters 40B and 40C via the polarization beam combiners 42A and 42B, etc. In addition, the vertical-polarization and horizontal-polarization components of the input signal light are input respectively to the optical splitter 40B and the optical splitter 40C from the polarization beam splitter 43a.

The optical splitter 40B splits light, received via a port on the nonlinear-optical-medium-44C-side, that includes the wavelength converted signal light of the horizontal-polarization component of the input signal light, outputs one of the resultant beams to the polarization beam splitter 43a, and outputs the other to the monitor 48A. The optical splitter 40C splits light, received via a port on the nonlinear-optical-medium-44C-side, that includes the wavelength converted signal light of the vertical-polarization component of the input signal light, outputs one of the resultant beams to the polarization beam splitter 43a, and outputs the other to the monitor 48B.

The optical splitter 40B outputs the vertical-polarization component of the input signal light received from the polarization beam splitter 43a to the polarization beam combiner 42A. The optical splitter 40C outputs the horizontal-polarization component of the input signal light received from the polarization beam splitter 43a to the polarization controller 46B.

In accordance with an instruction from the controller 49F, the polarization controller 46B controls the polarizations of the beams of wavelength converted signal light and the pump light so that the beams of the wavelength converted signal light, respectively from the optical splitters 40B and 40C to the polarization beam splitter 43a, are transmitted toward the optical filter 47. More specifically, the polarization controller 46B controls the polarization state of light transmitted from the polarization beam combiner 42B to the optical splitter 40C and the polarization state of light transmitted from the optical splitter 40C to the polarization beam combiner 42B in accordance with an instruction from the controller 49F.

The pump light generator 16 generates CW1 through CW4 and outputs them to the optical splitter 40A similarly to the first example. In the third example, CW1 and CW2 are horizontal polarizations and CW3 and CW4 are vertical polarizations.

The optical splitter 40A guides CW1 and CW2 to the optical intensity adjuster 41A, and guides CW3 and CW4 to the optical intensity adjuster 41B.

Similarly to the first example, the optical intensity adjuster 41A adjusts the optical intensities of CW1 and CW2, and outputs these beams to the polarization beam combiner 42A in accordance with an instruction from the controller 49A. The optical intensity adjuster 41B adjusts the optical intensities of CW3 and CW4, and outputs these beams to the polarization beam combiner 42B in accordance with an instruction from the controller 49A.

Similarly to the first example, the polarization beam combiner 42A combines the vertical-polarization component of the input signal light and the pump light (CW1 and CW2) such that the polarizations of the vertical-polarization component and the pump light are orthogonal to each other. The vertical-polarization component of the input signal light and the pump light that are combined by the polarization beam combiner 42A are guided to the nonlinear optical medium 44C. In this example, the polarization beam combiner 42A corresponds to the polarization adjustment unit. The polarization beam combiner 42B combines the input signal light and the pump light (CW3 and CW4) similar to the polarization beam combiner 42A. Note that the polarization beam splitter 43a corresponds to the polarization adjustment unit when the polarization beam splitter 43a appropriately splits input signal light.

In addition to the above operations, the polarization beam combiner 42A transmits the wavelength converted signal light of the horizontal-polarization component of input signal light generated in the nonlinear optical medium 44C to the optical splitter 40B. Similarly, the polarization beam combiner 42B transmits the wavelength converted signal light of the vertical-polarization component of the input signal light generated in the nonlinear optical medium 44C to the polarization controller 46B.

The nonlinear optical medium 44C performs a cross phase modulation on the vertical-polarization component of the input signal light of the first frequency with the horizontally polarized pump light (CW1 and CW2) so as to generate wavelength converted signal light of the second frequency, the horizontally polarized pump light and the input signal light both being from the polarization beam combiner 42A. The nonlinear optical medium 44C outputs this wavelength converted signal light of the second frequency to the polarization beam combiner 42B.

The nonlinear optical medium 44C performs a cross phase modulation on the horizontal-polarization component of the input signal light of the first frequency with the vertically polarized pump light (CW3 and CW4) so as to generate wavelength converted signal light of the second frequency, the vertically polarized pump light and the input signal light both being from the polarization beam combiner 42B. The nonlinear optical medium 44C outputs this wavelength converted signal light of the second frequency to the polarization beam combiner 42A.

The polarization beam splitter 43a guides the wavelength converted signal light coming from the optical splitter 40B and the wavelength converted signal light coming from the optical splitter 40C to the optical filter 47.

The optical filter 47 transmits the wavelength converted signal light to the optical splitter 40D based on the wavelength of the wavelength converted signal light. The optical filter 47 blocks the input signal light, which is a noise component output from the polarization beam splitter 43a together with the wavelength converted signal light.

Similarly to the first and second examples, the optical splitter 40D splits the wavelength converted signal light received from the optical filter 47, outputs one of the resultant beams as output signal light, and outputs the other to the monitor 48C.

Similarly to the above examples, the monitor 48A monitors the power of the wavelength converted signal light received from the optical splitter 40B, and based on the result, generates a control signal that causes the wavelength converted signal light to have a desirable, such as maximum for example, value as its power so as to output the control signal to the controller 49A. The operation of the monitor 48B is substantially the same as that of the monitor 48A.

The monitor 48C monitors the power of the wavelength converted signal light received from the optical splitter 40D, and based on the result, generates a control signal that causes the wavelength converted signal light to have a desirable, such as maximum for example, value as its power so as to output the control signal to the controller 49F.

Respectively in accordance with control signals from the monitors 48A and 48B, the controllers 49A and 49B control the optical intensity adjusters 41A and 41B such that desired conversion efficiency can be achieved. The operation of the controller 49F is substantially the same as the first or second example.

In the wavelength converter 1C of the present example, the horizontal-polarization component and the vertical-polarization component of input signal light travel along an identical optical path in the opposite directions, and the beams of the wavelength converted signal light of these components as well travel along an identical optical path in the opposite directions. This eliminates the need to consider a phase difference between the horizontal-polarization component and the vertical-polarization component caused by a difference in length between the optical paths for the horizontal-polarization component and the vertical-polarization component of the input signal light, and also eliminates the need for the optical phase adjuster and the controller to control the adjuster, leading to a still simpler parts configuration. The elimination of the need for the optical phase adjuster and the controller to control the adjuster also reduces power consumption. Further, it is not needed to adjust the lengths of optical paths for the horizontal-polarization component, the vertical-polarization component, etc. of the input signal light to an identical length in the wavelength converter 1C.

Fourth Example

Figure 8:
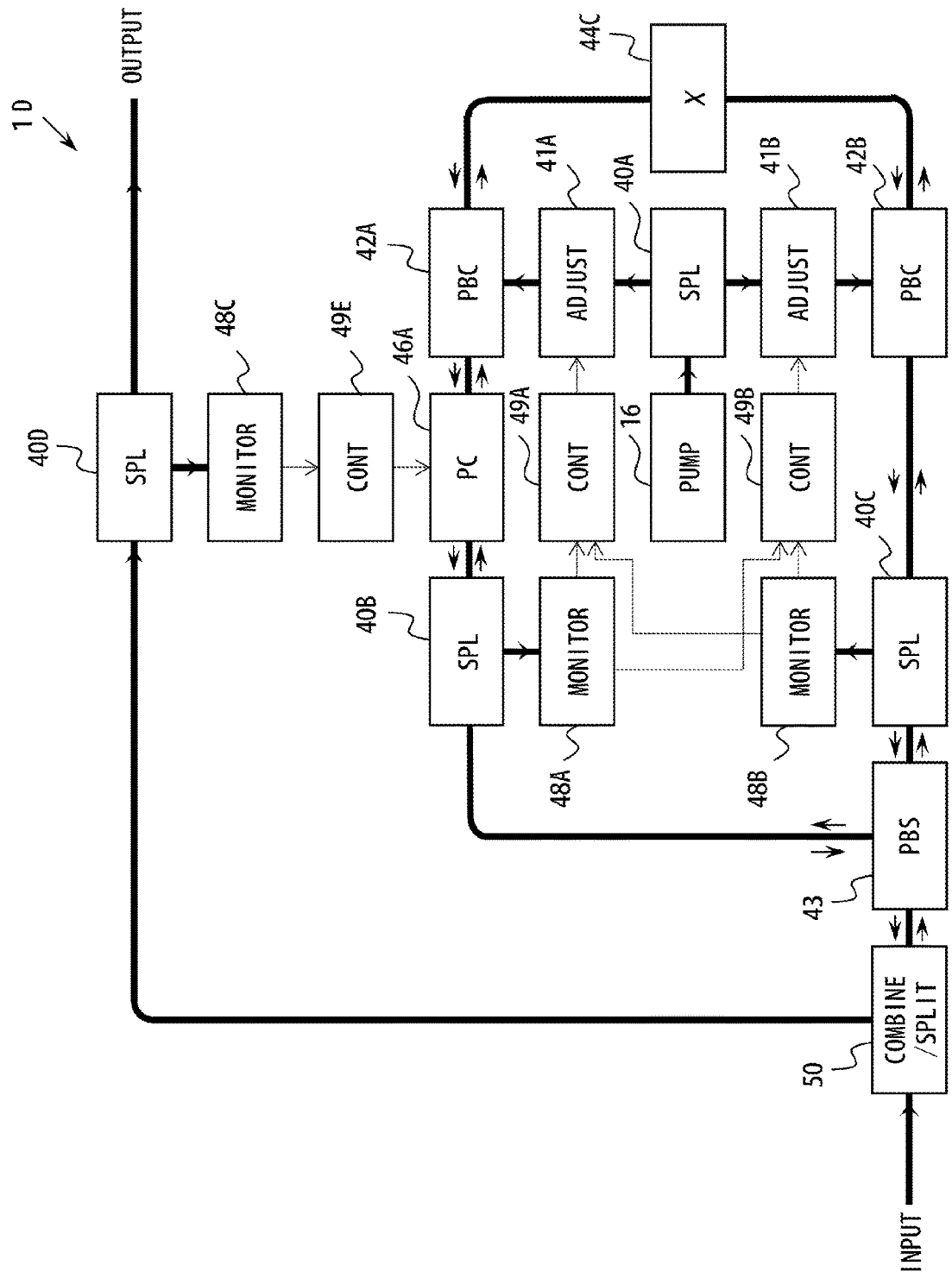
FIG. 8 illustrates an example of a wavelength converter of the fourth example.

FIG. 8 illustrates an example of a wavelength converter according to the fourth example. It is assumed in the present example that the input signal light is polarization multiplexed light. A wavelength converter 1D of the present example includes an optical combiner/splitter 50, the polarization beam splitter 43, the optical splitters 40A, 40B, 40C, and 40D, the polarization controller 46A, the pump light generator 16, the optical intensity adjusters 41A and 41B, etc. The wavelength converter 1D also includes the polarization beam combiners 42A and 42B, the nonlinear optical medium 44C, the monitors 48A through 48C, the controllers 49A, 49B, and 49E, etc. Functional units that are similar to and operate similarly to their counterparts in the above examples will not be explained unless otherwise stated.

The optical combiner/splitter 50 guides the input signal light to the polarization beam splitter 43. The optical combiner/splitter 50 also guides the wavelength converted signal light of the second frequency from the polarization beam splitter 43 to the optical splitter 40D. The optical combiner/splitter 50 blocks signal light of the first frequency output from the polarization beam splitter 43 so as not to be transmitted to the optical splitter 40D.

Similarly to the first example, the polarization beam splitter 43 has three ports. The polarization beam splitter 43 receives the input signal light, and outputs the wavelength converted signal light as output signal light through the first. In addition, the polarization beam splitter 43 respectively outputs the polarizations of the input signal light toward the nonlinear optical medium 44C through the second port and third port.

The polarization beam splitter 43 polarization splits the input optical signal received from the optical combiner/splitter 50, guides the vertical-polarization component of the input optical signal to the optical splitter 40B, and guides the horizontal-polarization component of the input optical signal to the optical splitter 40C.

In the present example as well, these polarization components travel along an identical looped optical path in the opposite directions. The beams of the wavelength converted signal light obtained from these polarization components as well travel along this identical optical path in the opposite directions to enter the polarization beam splitter 43.

The polarization beam splitter 43 combines two beams of wavelength converted signal light such that the two beams are in polarization states orthogonal to each other, the first wavelength converted signal light being received from the optical splitter 40B and generated from the horizontal-polarization component of the input signal and the second wavelength converted signal light being received from the optical splitter 40C and generated from the vertical-polarization component of the input signal. The polarization beam splitter 43 outputs the two beams of wavelength converted signal light to the optical combiner/splitter 50. Also, the polarization beam splitter 43 blocks the pump light (CW3 and CW4) received from the optical splitter 40B and the pump light (CW1 and CW2) received from the optical splitter 40C.

Similarly to the third example, the optical splitters 40B and 40C respectively receive beams of light generated in the nonlinear optical medium 44C via the polarization beam combiners 42A and 42B. Also, the polarization beam splitter 43 outputs the vertical-polarization and horizontal-polarization components of the input signal light respectively to the optical splitters 40B and 40C.

The optical splitter 40B splits the light containing the wavelength converted light of the horizontal-polarization component of the input signal light received through the port on the polarization-controller-46A side, outputs one of the resultant beams to the polarization beam splitter 43, and outputs the other to the monitor 48A. The optical splitter 40C splits the light containing the wavelength converted light of the vertical-polarization component of the input signal light received through the port on the polarization-beam-combiner-42B side, outputs one of the resultant beams to the polarization beam splitter 43, and outputs the other to the monitor 48B.

The optical splitter 40B guides the vertical-polarization component of the input signal light received from the polarization beam splitter 43 to the polarization controller 46A. The optical splitter 40C guides the horizontal-polarization component of the input signal light received from the polarization beam splitter 43 to the polarization beam combiner 42B.

In accordance with an instruction from the controller 49E, the polarization controller 46A controls the polarizations of the beams of the wavelength converted signal light and the pump light such that the beams of the wavelength converted signal light are transmitted to the optical combiner/splitter 50 by the polarization beam splitter 43. More specifically, the polarization controller 46A rotates, by 90 degrees, the polarization of light passing through it.

Thus, the vertical component of the signal light traveling in the clockwise direction from the polarization beam splitter 43 is controlled by the polarization controller 46A to be in a horizontal polarization, and thereafter returns to the polarization beam splitter 43. Meanwhile, CW1 and CW2, traveling in the same direction as this signal light, are in a vertical polarization in this example, and are guided to the polarization beam splitter 43 without passing through the polarization controller 46A. The input/output port of the polarization beam splitter 43 connected to the optical splitter 40C allows the horizontal polarization to pass through it and blocks the vertical polarization. As a result, signal light traveling in the clockwise direction passes through the polarization beam splitter 43 to be guided to the optical combiner/splitter 50, and CW1 and CW2 are blocked.

The horizontal component of the signal light traveling in the counter-clockwise direction from the polarization beam splitter 43 is controlled by the polarization controller 46A to be in a vertical polarization, and thereafter returns to the polarization beam splitter 43. Meanwhile, CW3 and CW4, traveling in the same direction as this signal light, are in a vertical polarization in this example, and are guided to the polarization beam splitter 43 after being controlled by the polarization controller 46A to be in a horizontal polarization. The input/output port of the polarization beam splitter 43 connected to the optical splitter 40B allows the vertical polarization to pass through it and blocks the horizontal polarization. As a result, signal light traveling in the counter-clockwise direction passes through the polarization beam splitter 43 to be guided to the optical combiner/splitter 50, and CW3 and CW4 are blocked.

The pump light generator 16 and the optical splitter 40A, which are respectively similar to their counterparts in the above examples, will not be explained.

The optical intensity adjusters 41A and 41B, which are respectively similar to their counterparts in the above examples, will not be explained.

The polarization beam combiner 42A combines the vertical-polarization component of the input signal light transmitted through the polarization controller 46A and the pump light from the optical intensity adjuster 41A (CW1 and CW2) such that the polarization of the input signal light is orthogonal to the polarizations of the pump light, and outputs the resultant light to the nonlinear optical medium 44C. The polarization beam combiner 42A also receives the wavelength converted signal light of the horizontal-polarization component of the input signal light generated in the nonlinear optical medium 44C, and outputs this wavelength converted signal light to the polarization controller 46A.

The polarization beam combiner 42B combines the horizontal-polarization component of the input signal light from the optical splitter 40C and the pump light (CW3 and CW4) from the optical intensity adjuster 41B such that the polarizations of the input signal light is orthogonal to the polarizations of the pump light, and outputs the resultant light to the nonlinear optical medium 44C. The polarization beam combiner 42B further receives the wavelength converted signal light of the vertical-polarization component of the input signal light generated in the nonlinear optical medium 44C, and outputs this wavelength converted signal light to the optical splitter 40C.

The other operations etc. performed by the polarization beam combiners 42A and 42B are similar to their counterparts in the above examples, and will not be explained.

The nonlinear optical medium 44C, which is similar to the counterpart in the above examples, will not be explained.

The optical splitter 40D splits the wavelength converted signal light received from the optical combiner/splitter 50, outputs one of the resultant beams as output signal light, and outputs the other to the monitor 48C.

The monitors 48A and 48B, which are similar to their counterparts in the above examples, will not be explained.

The monitor 48C monitors the power of the wavelength converted signal light received from the optical splitter 40D, and based on the result, generates a control signal that causes the wavelength converted signal light to have a desirable value as its power so as to output the control signal to the controller 49E.

The controllers 49A and 49B, which are similar to their counterparts in the above examples, will not be explained.

The controller 49E, which is similar to those in the first and second examples, will not be explained.

Similarly to the wavelength converter 1C, the wavelength converter 1D of the present example allows the use of an identical looped optical path for both the horizontal-polarization component and the vertical-polarization component of the input signal light and eliminates the need to adjust the lengths of the optical paths to an identical length, enabling easier formation etc. of the wavelength converter 1D at lower cost.

Fifth Example

FIG. 9 illustrates an example of a wavelength converter of the fifth example. Instead of the nonlinear optical medium 44C of the wavelength converter 1D illustrated in FIG. 8, a wavelength converter 1E of the present example includes two nonlinear optical media 44A and 44B and a polarizer 51 disposed between them. This polarizer 51 corresponds to the polarizer 15 illustrated in FIG. 4. Also, the nonlinear optical media 44A and 44B of the present example respectively correspond to the nonlinear optical media 44A and 44B of the first and second examples.

The functional units of the wavelength converter 1E will not be explained unless otherwise stated because they are similar to those in the wavelength converter 1D of the fourth example apart from the nonlinear optical media 44A and 44B and the polarizer 51.

Similarly to the fourth example, the polarization beam combiner 42A combines the vertical-polarization component of the input signal light through the polarization controller 46A and the pump light from the optical intensity adjuster 41A. The polarization beam combiner 42A outputs the light resulting from the combining to the nonlinear optical medium 44A.

Similarly to the fourth example, the polarization beam combiner 42B combines the horizontal-polarization component of the input signal light from the optical splitter 40C and the pump light from the optical intensity adjuster 41B, and outputs the resultant light to the nonlinear optical medium 44B.

The other operations etc. performed by the polarization beam combiners 42A and 42B are similar to those of the fourth example, and will not be explained.

Similarly to the first example, the nonlinear optical medium 44A performs a cross phase modulation on the input signal light with the pump light, and thereby generates the wavelength converted signal light of the second frequency, the pump light and the input signal light both being from the polarization beam combiner 42A. The nonlinear optical medium 44A outputs the generated wavelength converted signal light to the polarizer 51.

Similarly to the first example, the nonlinear optical medium 44B performs a cross phase modulation on the input signal light with the pump light, and thereby generates wavelength converted signal light of the second frequency so as to output the generated wavelength converted signal light to the polarizer 51, the pump light and the input signal light both being from the polarization beam combiner 42B.

The polarizer 51 transmits the wavelength converted signal light received from the nonlinear optical medium 44A to the nonlinear optical medium 44B but blocks the pump light whose polarization being orthogonal to the polarization of this wavelength converted signal light. Similarly, the polarizer 51 transmits the wavelength converted signal light received from the nonlinear optical medium 44B to the nonlinear optical medium 44A but blocks the pump light whose polarization being orthogonal to the polarization of this wavelength converted signal light.

The polarization controller 46A rotates, by 90 degrees, the polarization of light passing through it in this example. The polarizer 51 allows a horizontal polarization to pass through it, and blocks a vertical polarization. The vertical-polarization component extracted by the polarization beam splitter 43 from the input optical signal travels in the clockwise direction, and the horizontal-polarization component travels in the counter-clockwise direction. In this situation, the input signal light is controlled in the wavelength converter 1E as below.

The clockwise-traveling signal light is converted into a horizontal polarization in the polarization controller 46A, and thereafter is guided to the nonlinear optical medium 44A. CW1 and CW2 are also guided to the nonlinear optical medium 44A. However, CW1 and CW2 are in a vertical polarization in this example. Thus, the clockwise-traveling signal light passes through the polarizer 51 to return to the polarization beam splitter 43 after receiving a wavelength conversion in the nonlinear optical medium 44A. In this process, CW1 and CW2, which are in a vertical polarization, are blocked by the polarizer 51.

The counterclockwise-traveling signal light is guided to the nonlinear optical medium 44B as it is in a horizontal polarization. CW3 and CW4 are also guided to the nonlinear optical medium 44B. However, CW3 and CW4 are in a vertical polarization in this example. Thus, the counterclockwise-traveling signal light passes through the polarizer 51 after receiving a wavelength conversion in the nonlinear optical medium 44B. Thereafter, the counterclockwise-traveling signal light is converted into a vertical polarization in the polarization controller 46A, and thereafter is guided to the polarization beam splitter 43. In this process, CW3 and CW4, which are in a vertical polarization, are blocked by the polarizer 51.

The wavelength converter 1E of the present example prevents pump light, which functions be noise, from accompanying the wavelength converted signal light before the polarization beam splitter 43 outputs the wavelength converted signal light to the optical combiner/splitter 50. This can further reduce noise in the wavelength converted signal light that is to be output. Also, the beams, toward the monitors 48A and 48B, resulting from the splitting by the optical splitters 40B and 40C and are not mixed with the pump light, enabling the monitors 48A and 48B to accurately obtain the powers of the beams of the wavelength converted signal light so as to generate a more accurate control signal for obtaining wavelength converted light having a desired power.

Sixth Example

Figure 10:
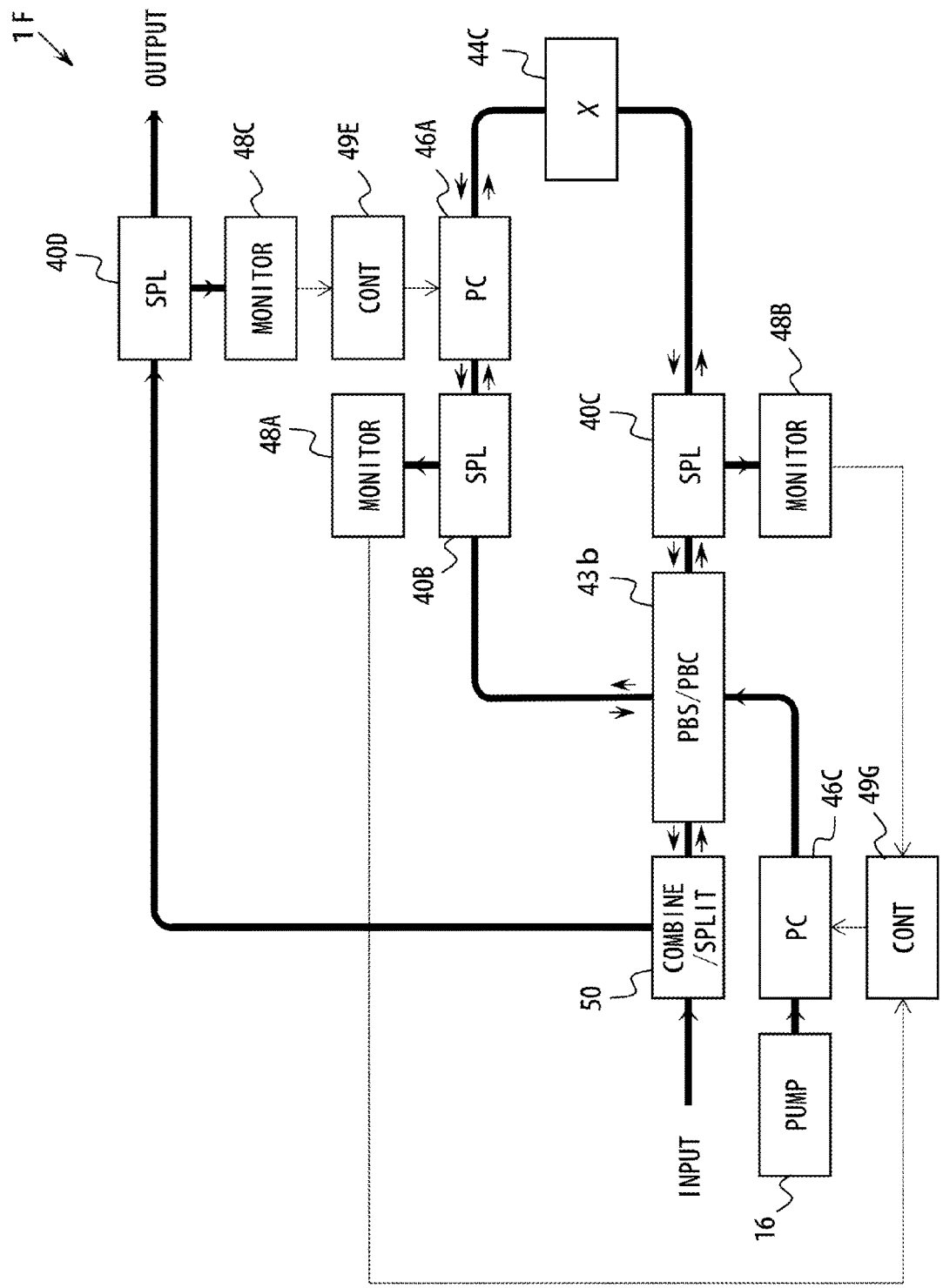
FIG. 10 illustrates an example of a wavelength converter of the sixth example.

FIG. 10 illustrates an example of a wavelength converter of the sixth example. A wavelength converter 1F of the present example corresponds to a variation of a converter including a combination of the functional units of the wavelength converters 1B and 1D of the second and fourth examples.

The wavelength converter 1F has the configuration of the wavelength converter 1D of the fourth embodiment except that it includes a polarization beam splitter/combiner 43b instead of the polarization beam splitter 43 and the polarization beam combiners 42A and 42B. The polarization beam splitter/combiner 43b corresponds to the polarization beam splitter 43a of the second example. The wavelength converter 1F includes the polarization controller 46C and the controller 49G for controlling the polarization controller 46C instead of the optical intensity adjusters 41A, 41B, the controllers 49A and 49B for controlling the optical intensity adjusters 41A and 41B, and the optical splitter 40A of the wavelength converter 1D.

The other functional units are similar to those in the wavelength converter 1D, and thus will not be explained unless otherwise stated.

The optical combiner/splitter 50 transmits the input signal light to the polarization beam splitter/combiner 43b. The pump light generator 16 outputs the pump light to the polarization controller 46C. The polarization controller 46C and the controller 49G, which are similar to their counterparts in the second example, will not be explained.

Similarly to the polarization beam splitter 43a, the polarization beam splitter/combiner 43b includes four or more input/output ports, and receives input signal light and pump light respectively through two different ports from among the four or more input/output ports. The polarization beam splitter/combiner 43b splits the input signal light into a vertical-polarization component and a horizontal-polarization component. The polarization beam splitter/combiner 43b combines the CW1 and CW2 and the vertical-polarization component of the input signal light such that the polarizations of CW1 and CW2 are orthogonal to the polarization of the vertical-polarization component of the input signal light. Similarly, the polarization beam splitter/combiner 43b combines CW3 and CW4 and the horizontal-polarization component of the input signal light such that the polarizations of CW3 and CW4 are orthogonal to the polarization of the horizontal-polarization component of the input signal light.

In the present example, the polarization beam splitter/combiner 43b corresponds to the polarization adjustment unit. However, the polarization controller 46C may correspond to the polarization adjustment unit as explained in the second example.

Next, the polarization beam splitter/combiner 43b outputs the vertical-polarization component of the input signal light and CW1 and CW2 to the optical splitter 40B, and outputs the horizontal-polarization component of the input signal light and CW3 and CW4 to the optical splitter 40C.

Similarly to the fourth example, the polarization beam splitter/combiner 43b combines the wavelength converted signal light of the horizontal-polarization component of the input signal from the optical splitter 40B and the wavelength converted signal light of the vertical-polarization component of the input signal from the optical splitter 40C such that the two beams of the wavelength converted signal light are in polarization states orthogonal to each other. The polarization beam splitter/combiner 43b outputs the wavelength converted signal light generated through the combining to the optical combiner/splitter 50. Also, the polarization beam splitter/combiner 43b does not output, to the optical combiner/splitter 50, the pump light (CW3 and CW4) received from the optical splitter 40B and the pump light (CW1 and CW2) received from the optical splitter 40C.

The monitors 48A and 48B, which are similar to the counterparts in the second example, will not be explained.

The wavelength converter 1F of the present example needs still fewer parts serving as the functional unit than the wavelength converters of the above examples, enabling still easier formation of the wavelength converter 1F.

Seventh Example

FIG. 11 illustrates an example of a wavelength converter of the seventh example. As in the fifth example, a wavelength converter 1G of the present example includes the two nonlinear optical media 44A and 44B and the polarizer 51 disposed between them instead of the nonlinear optical medium 44C of the wavelength converter 1F. The nonlinear optical media 44A and 44B of the present example correspond to the nonlinear optical media 44A and 44B of the fifth example.

The functional units of the wavelength converter 1G, which are similar to the counterparts in the wavelength converter 1F of the sixth example apart from the nonlinear optical media 44A and 44B and the polarizer 51, will not be explained. Also, the nonlinear optical media 44A and 44B and the polarizer 51 of the present example, which are similar to the counterparts of the fifth example, will not be explained.

Similarly to the fifth example, the wavelength converter 1G of the present example can reduce noise in the wavelength converted signal light. Further, the beams of light toward the monitors 48A and 48B are not mixed with pump light, making it possible to more accurately obtain wavelength converted light having a desired power.

Eighth Example

FIG. 12 illustrates an example of the pump light source 16 (pump light source 11) provided in the wavelength converter of the above examples.

A pump light source 16A includes two light sources (CW light sources) 160A and 160B for generating continuous wave light (CW light), an optical combiner 161, a phase modulator 162, a signal source 163, a controller 164, etc.

The CW light source 160A generates continuous wave light CW1 of a frequency of vp1 in accordance with signal-wavelength information, and outputs continuous wave light CW1 to the optical combiner 161. This signal-wavelength information is obtained from the external environment by the pump light source 16A and the pump light source 16B, which will be described later, and contains information specifying the value of the frequency of the pump light. A functional unit (not illustrated) in for example the wavelength converter 1, the optical transmission device 2, etc. in advance holds information related to the first frequency of input signal light, and outputs such information to the pump light source 16 based on this signal-wavelength information. The information related to the first frequency is information such as for example the C band, the frequencies of the beams of signal light output from the C-band transmitters 200 or the frequencies of the beams of signal light output from the C-band wavelength combiners 201 in FIG. 2. The signal-wavelength information may be manually input to the pump light source 16 by the user.

Similarly to the CW light source 160A, the CW light source 160B generates continuous wave light CW2 of a frequency of vp2 (vp2=vp1+Δv) in accordance with the signal-wavelength information, and outputs CW2 to the optical combiner 161. Note that the CW light sources 160A and 160B are configured in such a manner for example that the beams of continuous wave light CW1 and CW2 are in the same polarization.

The optical combiner 161 combines the beams of light received from the CW light sources 160A and 160B, and outputs the combined light to the phase modulator 162.

In accordance with an electric signal received from the signal source 163, the phase modulator 162 performs a phase modulation on the light output from the optical combiner 161. The phase modulator 162 thereafter outputs the phase-modulated light to a functional unit outside the pump light source 16.

This phase modulation is for suppressing stimulated Brillouin scattering (SBS) that would occur in the nonlinear optical medium, and is applied in phase to CW1 and CW2. This prevents the SBS from affecting the quality of a wavelength converted optical signal generated through a cross phase modulation on the input signal light in a nonlinear optical medium, and thereby prevents the deterioration in the signal quality.

This phase modulation will be explained in more detail. Electric field $E_0(t)$ of input signal light is expressed by:

$$E_0(t)=(E_{0r}(t)+jE_{0i}(t))\exp(2\pi j v_0 t) \quad (1)$$

In the expression, t represents time, $E_{0r}(t)$ represents the real part of data modulation component, $E_{0i}(t)$ represents the imaginary part of data modulation component, and $v_0$ represents the first frequency.

Electric field $E_1(t)$ of CW1 is expressed by:

$$E_1(t)=E_1 \exp(2\pi j v_1 t+\theta_1(t)) \quad (2)$$

In the expression, $E_1$ represents a DC component of the electric field intensity of CW1, $\theta_1(t)$ represents a modulation phase applied to CW1 at time t, and $v_1$ is vp1.

Similarly, electric field $E_2(t)$ of CW2 is expressed by:

$$E_2(t)=E_2 \exp(2\pi j v_2 t+\theta_2(t)) \quad (3)$$

In the expression, $E_2$ represents a DC component with the electric field intensity of CW2, $\theta_2(t)$ represents a modulation phase applied to CW2 at time t, and $v_2$ is vp2.

When input signal light, CW1, and CW2 are provided to a nonlinear optical medium, the CW1 and the input signal light changes the refractive index in the nonlinear optical medium. CW2 receives a phase modulation through the change in the refractive index, and thereby output signal light, expressed by electric field $E_{out}(t)$ of expression (4) below, is output.

$$E_{out}(t)=J_1(\gamma L E_1(E_{0r}(t)+jE_{0i}(t)))E_2 \exp\{2\pi j(v_2+v_0-v_1)t+(\theta_2(t)-\theta_1(t))\} \quad (4)$$

In the expression, γ represents the nonlinear optical coefficient of nonlinear optical medium, L represents the length of nonlinear optical medium, and $J_1(m)$ represents first order Bessel function of the first kind.

Frequency difference Δv between the input signal light and the output signal light is expressed by the expression below based on expressions (1) and (4):

$$\Delta v=(v_2+v_0-v_1)-v_0=v_2-v_1 \quad (5).$$

This demonstrates that the frequency difference between the input signal light and the output signal light is substantially the same as the frequency difference between CW1 and CW2.

$J_1(\gamma L E_1(\gamma L E_1(E_{0r}(t)+jE_{0i}(t))))E_2$ in expression (4) is the data modulation component of the output signal light. When the phase modulation level that is sufficiently low, the data modulation component can be varied as below.

$$J_1(\gamma LE_1(E_{0r}(t)+jE_{0i}(t)))E_2 = \eta(E_{0r}(t)+iE_{0i}(t)) \quad (6)$$

In this expression, η represents the conversion efficiency. $\theta_2(t)-\theta_1(t)$ in expression (4) is a noise component in phase modulations to be applied to CW1 and CW2.

$$\theta_2(t)-\theta_1(t)=0 \quad (7)$$

In other words, having $\theta_1(t)$ and $\theta_2(t)$ in phase can prevent signal deterioration due to phase modulations to be applied to CW1 and CW2.

Note that the pump light source 16A may include a polarization controller that controls the polarization of light output from the phase modulator 162.

The pump light source 16A of the present example enables the conversion of the wavelength of the input signal light into a desired wavelength such as one in a different band because the frequency of the pump light is controlled based on information related to the frequency of the input signal light. The present example can also prevent deterioration, due to stimulated Brillouin scattering, in the wavelength converted signal light generated by a cross phase modulation on the input signal light with two beams of the pump light because phase modulations are applied in phase to the two beams of the pump light.

Ninth Example

Figure 13:
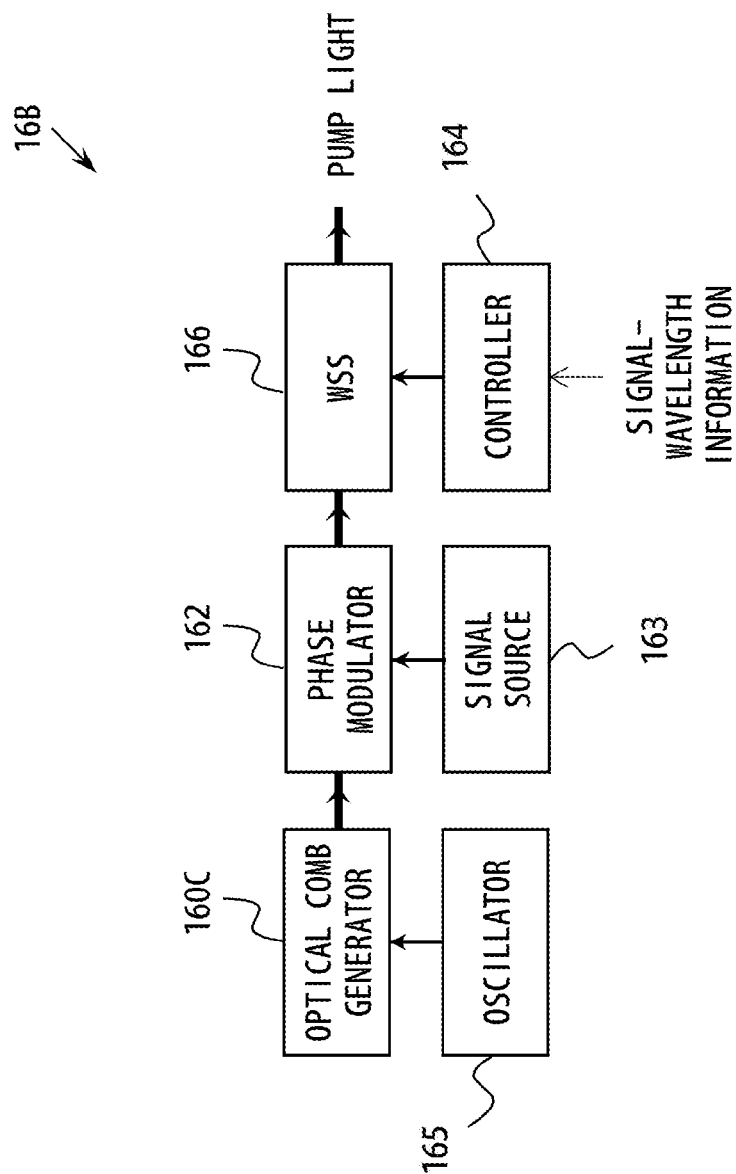
FIG. 13 illustrates another example of the pump light source.

FIG. 13 illustrates another example of the pump light source 16 (pump light sources 11).

The pump light source 16B includes an optical comb generator 160C, the phase modulator 162, the signal source 163, the controller 164, an oscillator 165, and a wavelength selective switch (WSS) 166.

The optical comb generator 160C generates a plurality of beams of continuous wave light, and outputs the beams to the phase modulator 162. The beams have the same phase. In addition, the interval of the beams depends on the frequency of the signals oscillated by the oscillator 165.

In accordance with an electric signal output from the signal source 163, the phase modulator 162 applies phase modulations in phase to light received from the optical comb generator 160C. The phase modulator 162 outputs the phase-modulated light to the wavelength selective switch 166.

In accordance with signal-wavelength information, the wavelength selective switch 166 extracts beams of continuous wave light of two frequencies (vp1 and vp2) from the light received from the phase modulator 162, and outputs the extracted beams to a functional unit outside the pump light source 16.

Using the pump light source 16B of the present example sometimes results in simultaneous generation of beams of wavelength converted signal light of (vs+|vp1−vp2|) and (vs−|vp1−vp2|), which are a high-frequency-side frequency and a low-frequency-side frequency, respectively. In that case, wavelength converted signal light of a desired frequency is extracted to be used for generating second signal light. Wavelength converted signal light not of a desired frequency may be used as signal light to be output to a monitor or a redundant path.

According to the present example, the use of the optical comb generator 160C enables the outputting of pump light of a desired frequency accurately and appropriately to the situation when for example the desired frequency varies from one situation to another.

The functional units described above do not have to be configured physically as illustrated in the drawings. In other words, the specific embodiments of the distribution and/or integration of the functional units are not limited to the drawings, and part or all of the functional units can be configured by being functionally or physically distributed and/or integrated in an arbitrary unit in accordance with various types of loads, usage conditions, etc.

A computer that includes a CPU (Central Processing Unit), an MPU (Micro Processing Unit), an MCU (Micro Controller Unit), or the like may implement the processes performed by the functional units. The processes thus performed may account for arbitrary part or all of the processes performed by the functional units described above. Also, for example a program executed by a CPU (or a microcomputer etc. such as for example an MPU and an MCU) or hardware based on wired logic hardware may implement part or whole of the processes performed by the functional units.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission device that transmits wavelength multiplexed light to a transmission line, the optical transmission device comprising:
    a first wavelength multiplexer configured to multiplex a plurality of optical signals in a first wavelength band to generate first wavelength multiplexed light;
    a second wavelength multiplexer configured to multiplex a plurality of optical signals in the first wavelength band to generate second wavelength multiplexed light in a first polarization;
    a wavelength converter configured to convert a wavelength of the second wavelength multiplexed light from the first wavelength band into a second wavelength band by a cross phase modulation among the second wavelength multiplexed light, first pump light in a second polarization, and second pump light in the second polarization, the second polarization being orthogonal to the first polarization, and a wavelength of the second pump light being different from a wavelength of the first pump light; and
    a third wavelength multiplexer configured to multiplex the second wavelength multiplexed light whose wavelength has been converted by the wavelength converter and the first wavelength multiplexed light, wherein
    a difference between a frequency of the first pump light and a frequency of the second pump light is equal to a frequency bandwidth of the second wavelength multiplexed light input to the wavelength converter.

2. The optical transmission device according to claim 1, wherein
    all of the wavelengths of the second wavelength multiplexed light input to the wavelength converter exist between the wavelength of the first pump light and the wavelength of the second pump light.

3. An optical transmission device that receives wavelength multiplexed light via a transmission line, the optical transmission device comprising:

a first wavelength splitter configured to extract first wavelength multiplexed light in a first wavelength band and second wavelength multiplexed light in a first polarization in a second wavelength band from the received wavelength multiplexed light;

a wavelength converter configured to convert a wavelength of the second wavelength multiplexed light from the second wavelength band into the first wavelength band by a cross phase modulation among the second wavelength multiplexed light, first pump light in a second polarization, and second pump light in the second polarization, the second polarization being orthogonal to the first polarization, and a wavelength of the second pump light being different from a wavelength of the first pump light; and a second wavelength splitter configured to split, into a plurality of optical signals, the second wavelength multiplexed light whose wavelength has been converted by the wavelength converter; and a third wavelength splitter configured to split the first wavelength multiplexed light into a plurality of optical signals, wherein a difference between a frequency of the first pump light and a frequency of the second pump light is equal to a frequency bandwidth of the second wavelength multiplexed light input to the wavelength converter.

4. An optical transmission method that transmits wavelength multiplexed light, the optical transmission method comprising:

multiplexing a plurality of optical signals in a first wavelength band to generate first wavelength multiplexed light;

multiplexing a plurality of optical signals in the first wavelength band to generate second wavelength multiplexed light in a first polarization;

converting a wavelength of the second wavelength multiplexed light from the first wavelength band into a second wavelength band by a cross phase modulation among the second wavelength multiplexed light, first pump light in a second polarization, and second pump light in the second polarization, the second polarization being orthogonal to the first polarization, and a wavelength of the second pump light being different from a wavelength of the first pump light; and multiplexing the second wavelength multiplexed light whose wavelength has been converted and the first wavelength multiplexed light, wherein a difference between a frequency of the first pump light and a frequency of the second pump light is equal to a frequency bandwidth of the second wavelength multiplexed light input to the wavelength converter.

5. An optical transmission method comprising:

receiving wavelength multiplexed light via a transmission line;

extracting first wavelength multiplexed light in a first wavelength band and second wavelength multiplexed light in a first polarization in a second wavelength band from the received wavelength multiplexed light;

converting a wavelength of the second wavelength multiplexed light from the second wavelength band into the first wavelength band by a cross phase modulation among the second wavelength multiplexed light, first pump light in a second polarization, and second pump light in the second polarization, the second polarization being orthogonal to the first polarization, and a wavelength of the second pump light being different from a wavelength of the first pump light;

splitting, into a plurality of optical signals, the second wavelength multiplexed light whose wavelength has been converted into the first wavelength band; and splitting the first wavelength multiplexed light into a plurality of optical signals, wherein a difference between a frequency of the first pump light and a frequency of the second pump light is equal to a frequency bandwidth of the second wavelength multiplexed light input to the wavelength converter.

* * * * *